(12) United States Patent
Zhang et al.

(10) Patent No.: US 12,137,234 B2
(45) Date of Patent: Nov. 5, 2024

(54) VIDEO ENCODING AND DECODING METHODS AND APPARATUSES, DEVICE, AND STORAGE MEDIUM

(71) Applicant: TENCENT TECHNOLOGY (SHENZHEN) COMPANY LIMITED, Guangdong (CN)

(72) Inventors: Hongbin Zhang, Guangdong (CN); Xiang Li, Guangdong (CN); Guichun Li, Guangdong (CN); Shan Liu, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 351 days.

(21) Appl. No.: 17/452,289

(22) Filed: Oct. 26, 2021

(65) Prior Publication Data
US 2022/0046253 A1    Feb. 10, 2022

Related U.S. Application Data

(63) Continuation of application No. PCT/CN2020/134514, filed on Dec. 8, 2020.

(30) Foreign Application Priority Data

Dec. 31, 2019 (CN) .................. 201911416697.X

(51) Int. Cl.
*H04N 19/18* (2014.01)
*H04N 19/176* (2014.01)
(Continued)

(52) U.S. Cl.
CPC ........... *H04N 19/18* (2014.11); *H04N 19/176* (2014.11); *H04N 19/186* (2014.11); *H04N 19/44* (2014.11); *H04N 19/593* (2014.11); *H04N 19/70* (2014.11)

(58) Field of Classification Search
None
See application file for complete search history.

(56) References Cited

U.S. PATENT DOCUMENTS 10,244,261 B2   3/2019   Xu et al.
10,735,767 B2   8/2020   Xu et al.
(Continued)

FOREIGN PATENT DOCUMENTS

CN   104104956 A   10/2014
CN   105872549 A   8/2016
(Continued)

OTHER PUBLICATIONS

Abdoli, Mohsen et al. "AHG11: Block DPCM for Screen Content Coding" JVET of ITU-T SG 16 WP 3 and ISO/IEC JTC 1/SC 29/WG 11 12th Meeting: Macao, CN Document: JVET-L0078, Oct. 12, 2018 (7 pages) (Year: 2018).*
(Continued)

*Primary Examiner* — Kaitlin A Retallick
(74) *Attorney, Agent, or Firm* — ArentFox Schiff LLP

(57) ABSTRACT

A video encoding method is provided. The method includes decoding intra-frame prediction mode information corresponding to a current decoding unit, decoding first identification information corresponding to the current decoding unit when the intra-frame prediction mode information indicates that a block differential pulse code modulation (BDPCM) mode is applied to the current decoding unit, determining, when the first identification information indicates that a transform block (TB) corresponding to the current decoding unit does not include any non-zero transform coefficients, that a residual block corresponding to the current decoding unit is an all-zero residual block, and reconstructing the current decoding unit according to the residual block and a prediction block corresponding to the current decoding unit. The technical solutions provided in
(Continued)

embodiments of this application improve the encoding and decoding efficiency of the decoding unit using the BDPCM mode. Apparatus and non-transitory computer-readable storage medium counterpart embodiments are also provided.

19 Claims, 7 Drawing Sheets

(51) Int. Cl.
*H04N 19/186* (2014.01)
*H04N 19/44* (2014.01)
*H04N 19/593* (2014.01)
*H04N 19/70* (2014.01)

(56) References Cited

U.S. PATENT DOCUMENTS

| | | | |
|---|---|---|---|
| 2018/0213258 A1 | 7/2018 | Xu et al. | |
| 2019/0215533 A1 | 7/2019 | Xu et al. | |
| 2022/0272322 A1* | 8/2022 | Lin | H04N 19/174 |
| 2022/0353505 A1* | 11/2022 | Kim | H04N 19/186 |

FOREIGN PATENT DOCUMENTS

| | | |
|---|---|---|
| CN | 109874012 A | 6/2019 |
| CN | 110073663 A | 7/2019 |

OTHER PUBLICATIONS

Abdoli, Mohsen et al. "AHG11: Block DPCM for Screen Content Coding" JVET of ITU-T SG 16 WP 3 and ISO/IEC JTC 1/SC 29/WG 11 12th Meeting: Macao, CN Document: JVET-L0078, Oct. 12, 2018 (7 pages).

Ray, Bappaditya et al. Non-CE5/AHG-11: Boundary strength harmonization for BDPCM, TS, Palette and IBC JVET of ITU-T SG 16 WP 3 and ISO/IEC JTC 1/SC 29/WG 11 16th Meeting: Geneva, CH Document: JVET-P0611-v1, Oct. 11, 2019 (8 pages).

Kuo, Chi-Chang et al. Non-CE8: Simplification of chroma BDPCM Syntax for single-tree JVET of ITU-T SG 16 WP 3 and ISO/IEC JTC 1/SC 29/WG 11 16th Meeting: Geneva, CH Document: JVET-P0900-v2, Oct. 11, 2019 (8 pages).

International Search Report mailed Mar. 10, 2021 issued in corresponding patent application PCT/CN2020/134514 (with English translation) citing documents AO-AR and AV-AX (7 pages).

Written Opinion mailed Mar. 10, 2021 issued in corresponding patent application PCT/CN2020/134514 (4 pages).

\* cited by examiner

Current video frame

VIDEO ENCODING AND DECODING METHODS AND APPARATUSES, DEVICE, AND STORAGE MEDIUM

RELATED APPLICATIONS

This application is a continuation of International Application No. PCT/CN2020/134514, entitled "VIDEO ENCODING AND DECODING METHODS AND APPARATUSES, DEVICE, AND STORAGE MEDIUM" and filed on Dec. 8, 2020, which claims priority to Chinese Patent Application No. 201911416697.X, entitled "VIDEO DECODING METHOD AND APPARATUS, DEVICE, AND STORAGE MEDIUM," filed on Dec. 31, 2019. The entire disclosures of the above-identified prior applications are incorporated herein by reference in their entirety.

FIELD OF THE TECHNOLOGY

Embodiments of this application relate to the field of video encoding and decoding technologies, including video encoding and decoding methods and apparatuses, a device, and a storage medium.

BACKGROUND OF THE DISCLOSURE

H.266 is a new-generation video encoding technology improved based on H.265/High Efficient Video Coding (HEVC), has been officially named Versatile Video Coding (VVC), and is continuously updated and improved under the organization and guidance of Joint Video Experts Team (WET).

Currently, a block differential pulse code modulation (BDPCM) mode is introduced to VVC, and is used for encoding and transmitting a quantized transform block (TB). However, video encoding and decoding methods currently adopted in VVC have low efficiency in encoding and decoding of coding blocks using the BDPCM mode.

SUMMARY

Embodiments of this disclosure provide video encoding and decoding methods and apparatuses, a device, and a storage medium, to improve the encoding and decoding efficiency of coding blocks using a BDPCM mode. The technical solutions are as follows.

According to an aspect, an embodiment of this disclosure provides a video decoding method, including: (1) decoding intra-frame prediction mode information corresponding to a current decoding unit; (2) decoding first identification information corresponding to the current decoding unit when the decoded intra-frame prediction mode information indicates that a BDPCM mode is applied to the current decoding unit, and all color components of the current decoding unit use the BDPCM mode, the first identification information indicating whether a TB corresponding to the current decoding unit includes a non-zero transform coefficient; (3) determining, when the first identification information indicates that the TB corresponding to the current decoding unit does not include any non-zero transform coefficients, that a residual block corresponding to the current decoding unit is an all-zero residual block; and (4) reconstructing the current decoding unit according to the residual block and a prediction block corresponding to the current decoding unit.

According to another aspect, an embodiment of this disclosure provides a video encoding method, including: (1) obtaining a current CU; (2) calculating a residual block corresponding to the current CU according to the current CU and a prediction block corresponding to the current CU; and (3) encoding first identification information corresponding to the current CU when the residual block corresponding to the current CU is an all-zero residual block, and all color components of the current CU use a BDPCM mode, the first identification information indicating that a TB corresponding to the current CU does not include any non-zero transform coefficients.

According to still another aspect, an embodiment of this disclosure provides a video decoding apparatus, including processing circuitry configured to (1) decode intra-frame prediction mode information corresponding to a current decoding unit; (2) decode first identification information corresponding to the current decoding unit when the decoded intra-frame prediction mode information indicates that a BDPCM mode is applied to the current decoding unit, and all color components of the current decoding unit use the BDPCM mode, the first identification information indicating whether a TB corresponding to the current decoding unit includes a non-zero transform coefficient; (3) determine, when the first identification information indicates that the TB corresponding to the current decoding unit does not include any non-zero transform coefficients, that a residual block corresponding to the current decoding unit is an all-zero residual block; and (4) reconstruct the current decoding unit according to the residual block and a prediction block corresponding to the current decoding unit.

According to still another aspect, an embodiment of this disclosure provides a video encoding apparatus, including: circuitry configured to (1) obtain a current CU; (2) calculate a residual block corresponding to the current CU according to the current CU and a prediction block corresponding to the current CU; and (3) encode first identification information corresponding to the current CU when the residual block corresponding to the current CU is an all-zero residual block, and all color components of the current CU use a BDPCM mode, the first identification information indicating that a TB corresponding to the current CU does not include any non-zero transform coefficients.

According to still yet another aspect, an embodiment of this disclosure provides a computer device, including processing circuitry and a memory, the memory storing at least one instruction, at least one program, a code set, or an instruction set, the at least one instruction, the at least one program, the code set, or the instruction set being loaded and executed by the processing circuitry to implement the foregoing video decoding method, or implement the foregoing video encoding method.

According to still yet another aspect, an embodiment of this disclosure provides a non-transitory computer-readable storage medium, storing at least one instruction, at least one program, a code set, or an instruction set, the at least one instruction, the at least one program, the code set, or the instruction set being loaded and executed by processing circuitry to implement the foregoing video decoding method, or implement the foregoing video encoding method.

According to still yet another aspect, an embodiment of this disclosure provides a computer program product, the computer program product, when executed by processing circuitry, being used for implementing the foregoing video decoding method or implementing the foregoing video encoding method.

The technical solutions provided in the embodiments of this disclosure may include the following beneficial effects.

For a CU (or a decoding unit) using a BDPCM mode, first identification information indicates whether a TB corresponding to the CU (or the decoding unit) includes a non-zero transform coefficient. If the first identification information indicates that the TB corresponding to the CU (or the decoding unit) does not include any non-zero transform coefficient, an encoder side does not need to encode a transform tree syntax structure corresponding to the CU to encode and transmit a residual block, and correspondingly, a decoder side either does not need to decode a transform tree syntax structure corresponding to the decoding unit to decode and obtain a residual block, and may directly determine that the residual block corresponding to the decoding unit is an all-zero residual block, thereby improving the encoding and decoding efficiency of the CU using the BDPCM mode.

DESCRIPTION OF EMBODIMENTS

To make objectives, technical solutions, and advantages of this application clearer, the following further describes implementations of this disclosure in detail with reference to the accompanying drawings.

Figure 1:
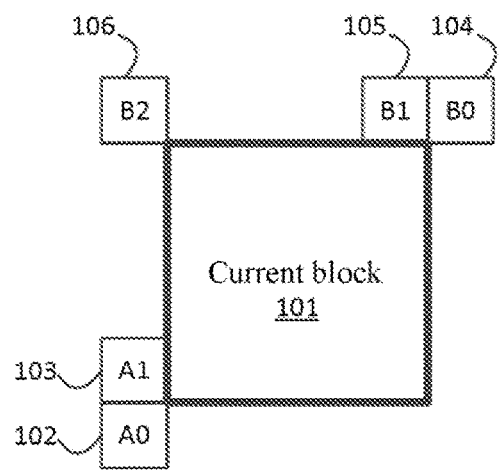
FIG. 1 is a schematic diagram of exemplary video encoding according to this disclosure.

Referring to FIG. 1, a current block 101 includes a sample that has been discovered by an encoder during a motion search, and the sample may be predicted according to a previous block with a same size that has been spatially offset. In addition, a motion vector (MV) may be derived from metadata associated with one or more reference pictures instead of directly encoding the MV. For example, the MV is derived from metadata of recent reference pictures (according to a decoding order) by using a MV associated with any one of five surrounding samples, namely, A0, A1, B0, B1, and B2 (corresponding to 102 to 106 respectively).

Figure 2:
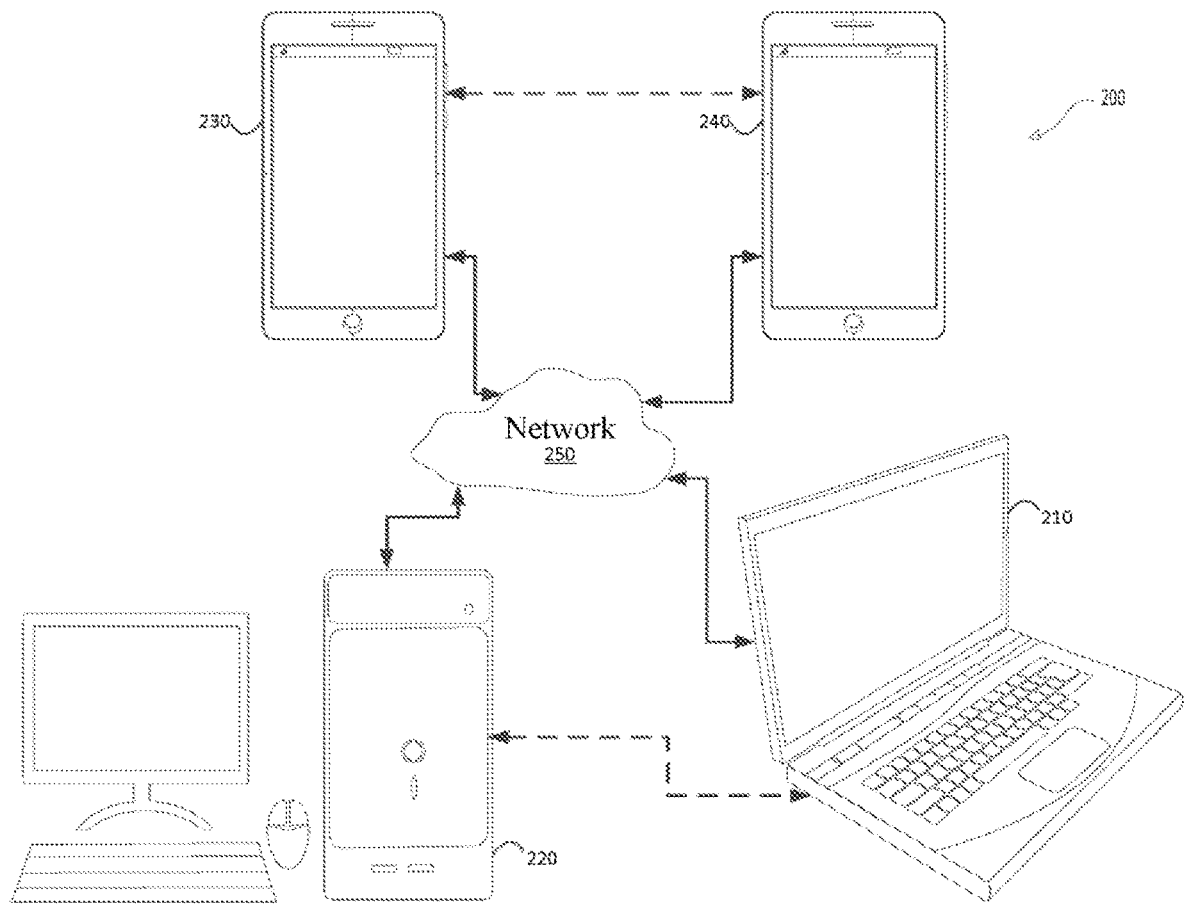
FIG. 2 is a simplified block diagram of a communication system according to an embodiment of this disclosure.

FIG. 2 is a simplified block diagram of a communication system according to an embodiment of this application. The communication system 200 includes a plurality of devices, and the devices may communicate with each other through, for example, a network 250. For example, the communication system 200 includes a first device 210 and a second device 220 interconnected by the network 250. In the embodiment of FIG. 2, the first device 210 and the second device 220 perform one-way data transmission. For example, the first device 210 may encode video data, for example, a video picture stream acquired by the first device 210, to transmit the encoded video data to the second device 220 through the network 250. The encoded video data is transmitted in the form of one or more encoded video bitstreams. The second device 220 may receive the encoded video data from the network 250, decode the encoded video data to restore the video data, and display video pictures according to the restored video data. The one-way data transmission is relatively common in applications such as a media service.

In another embodiment, the communication system 200 includes a third device 230 and a fourth device 240 that perform two-way transmission of encoded video data, and the two-way transmission may occur, for example, during a video conference. For the two-way data transmission, each of the third device 230 and the fourth device 240 may encode video data (for example, a video picture stream acquired by the device), to transmit the encoded video data to the other device in the third device 230 and the fourth device 240 through the network 250. Each of the third device 230 and the fourth device 240 may further receive encoded video data transmitted by the other device in the third device 230 and the fourth device 240, may decode the encoded video data to restore video data, and may display video pictures on an accessible display apparatus according to the restored video data.

In the embodiment of FIG. 2, the first device 210, the second device 220, the third device 230, and the fourth device 240 may be computer devices such as servers, personal computers (PCs), or smartphones, but the principle of this application may not be limited thereto. The embodiments of this disclosure are applicable to a PC, a mobile phone, a tablet computer, a media player, and/or a dedicated video conferencing device. The network 250 is any quantity of networks that transmit the encoded video data between the first device 210, the second device 220, the third device 230, and the fourth device 240, and includes, for example, wired and/or wireless communication networks. The communication network 250 may exchange data in circuit-switched and/or packet-switched channels. The network may include a telecommunications network, a local area network, a wide area network, and/or the Internet. For the objectives of this disclosure, unless explained below, an architecture and a topology of the network 250 may be insignificant for the operations disclosed in this disclosure.

Figure 3:
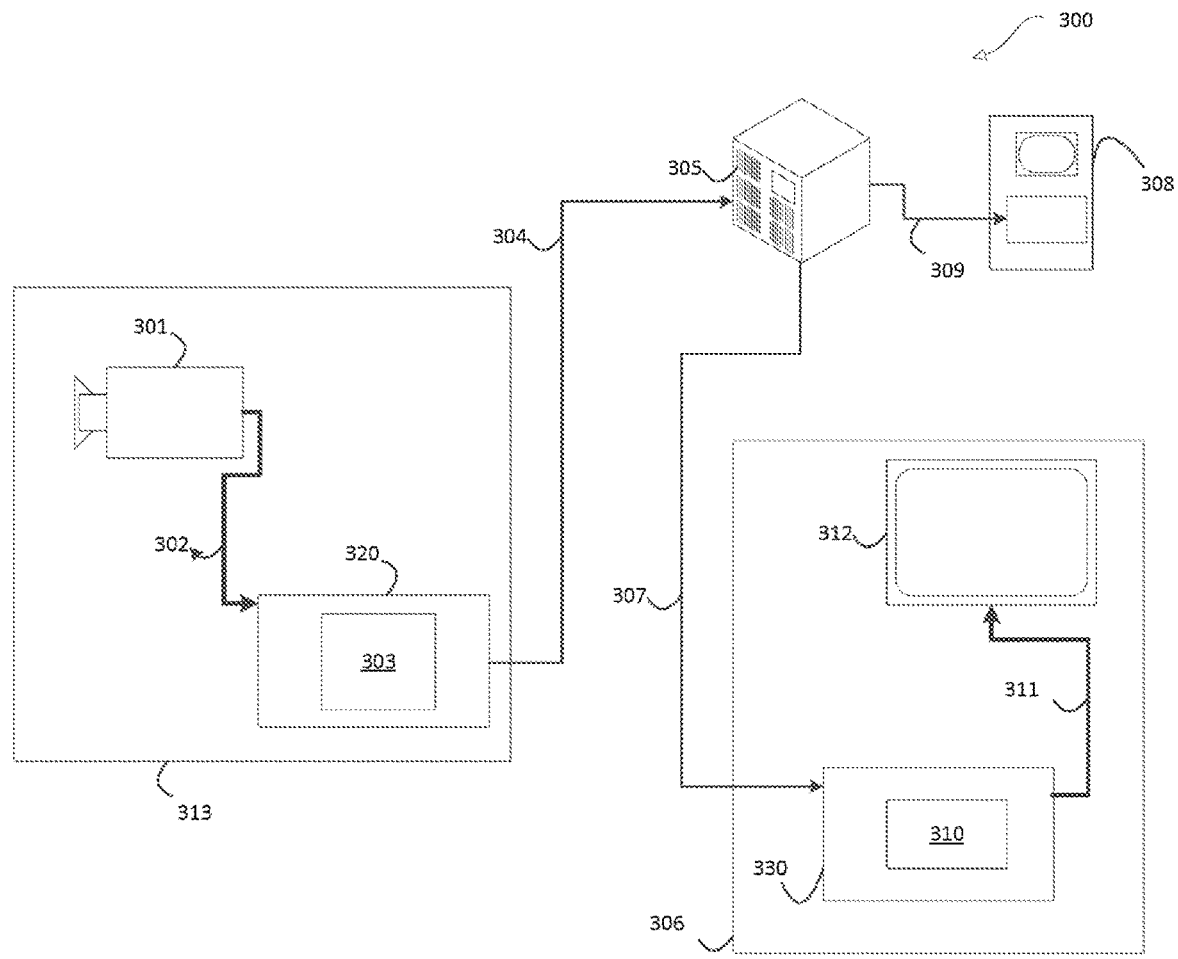
FIG. 3 is a schematic diagram of an exemplary deployment mode of a video encoder and a video decoder in a streaming transmission environment according to this disclosure.

In this embodiment, FIG. 3 shows a deployment mode of a video encoder and a video decoder in a streaming transmission environment. The subject matter disclosed in this disclosure is equally applicable to other applications supporting a video, including, for example, video conferencing, a digital television (TV), and storing a compressed video on digital mediums including a compact disc (CD), a digital versatile disc (DVD), a memory stick, and the like.

A streaming system may include an acquisition subsystem 313. The acquisition subsystem may include a video source 301 such as a digital camera. The video source creates an uncompressed video picture stream 302. In this embodiment, the video picture stream 302 includes samples shot by a digital camera. Compared with the encoded video data 304 (or the encoded video bitstream), the video picture stream 302 is depicted by a bold line to emphasize that the video picture stream has a high data amount, and the video picture stream 302 may be processed by an electronic device 320. The electronic device 320 includes a video encoder 303 coupled to the video source 301. The video encoder 303 may include hardware (processing circuitry), software, or a combination of software and hardware to implement or perform aspects of the disclosed subject matter as described in more detail below. Compared with the video picture stream 302, the encoded video data 304 (or an encoded video bitstream 304) is depicted by a thin line to emphasize that the encoded video data 304 (or the encoded video bitstream 304) has a relatively small data amount, and may be stored on a streaming transmission server 305 for future use. One or more streaming transmission client subsystems, for example, a client subsystem 306 and a client subsystem 308 in FIG. 3, may access the streaming transmission server 305 to retrieve a copy 307 and a copy 309 of the encoded video data 304. The client subsystem 306 may include, for example, a video decoder 310 in the electronic device 330. The video decoder 310 decodes the incoming copy 307 of the encoded video data, and generates an output video picture stream 311 that may be presented on a display 312 (for example, a display screen) or another presentation apparatus (not depicted). In some streaming transmission systems, the encoded video data 304, the video data 307, and the video data 309 (for example, the video bitstream) may be encoded according to some video encoding/compression standards.

The electronic device 320 and the electronic device 330 may include other components (not shown). For example, the electronic device 320 may include a video decoder (not shown), and the electronic device 330 may further include a video encoder (not shown). The video decoder is configured to decode the received encoded video data, and the video encoder is configured to encode the video data.

Figure 4:
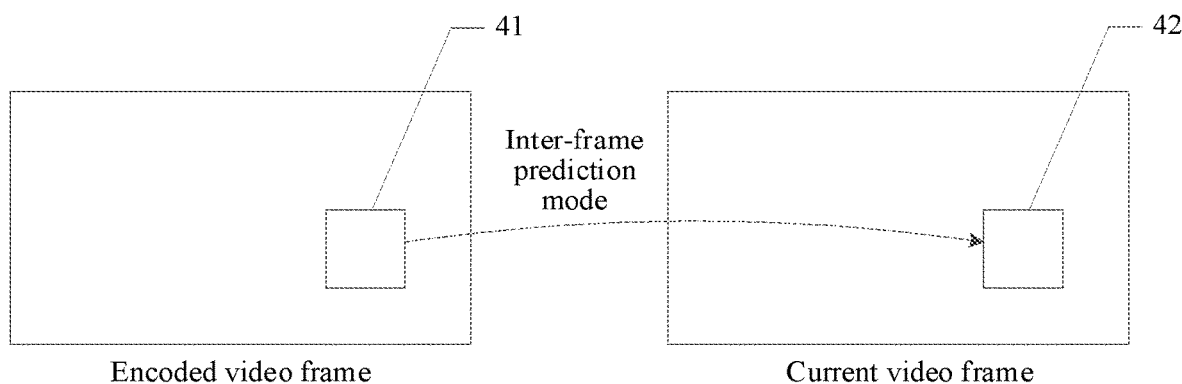
FIG. 4 is a schematic diagram of encoding in an inter-frame prediction mode according to an embodiment of this disclosure.
Figure 5:
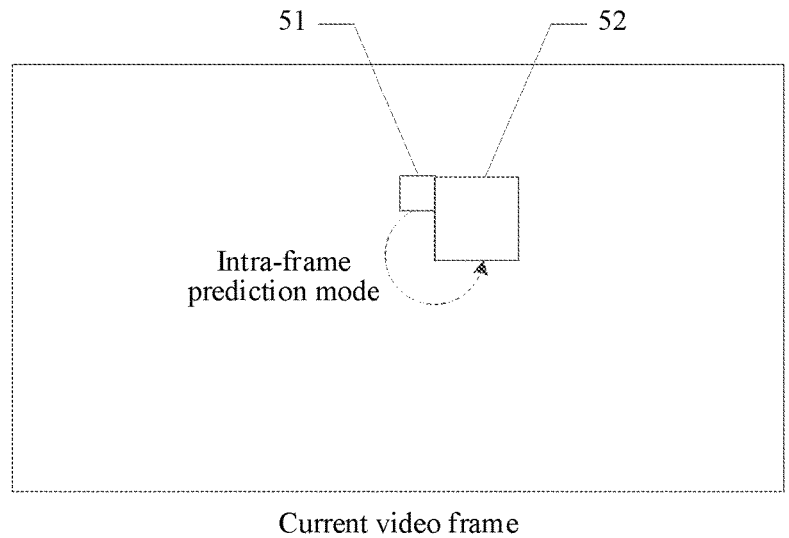
FIG. 5 is a schematic diagram of encoding in an intra-frame prediction mode according to an embodiment of this disclosure.

When an image block in a video frame is encoded, an inter-frame prediction mode or an intra-frame prediction mode may be used to generate a prediction block based on one or more encoded reference blocks. The prediction block may be a predicted version of an original block. A residual block may be generated by subtracting the original block from the prediction block, and vice versa. The residual block may be used for representing a prediction residual (or referred to as a prediction error). Because an amount of data that needs to be used for representing the prediction residual may generally be less than an amount of data that needs to be used for representing the original block, the residual block may be encoded to achieve a relatively high compression ratio. For example, as shown in FIG. 4, for an inter-frame prediction mode, an encoded reference block 41 and a to-be-encoded block 42 are present in two different video frames. As shown in FIG. 5, for an intra-frame prediction mode, an encoded reference block 51 and a to-be-encoded block 52 are present in a same video frame.

Then, a residual value of a residual block in a spatial domain may be converted into transform coefficients in a frequency domain. The conversion may be implemented through a two-dimensional transform such as a discrete cosine transform (DCT). In a transform matrix, low-index transform coefficients (for example, present in an upper left region) may correspond to a large spatial feature and have relatively large magnitudes; and high-index transform coefficients (for example, present in a lower right region) may correspond to a small spatial feature and have relatively small magnitudes. Further, a quantization matrix including a quantization coefficient may be applied to the transform matrix, to quantize all transform coefficients into quantized transform coefficients. A result of quantization is that a scale or a magnitude of the transform coefficients may be reduced. Some high-index transform coefficients may be reduced to zero, and may be skipped in subsequent scanning and encoding steps.

Figure 6:
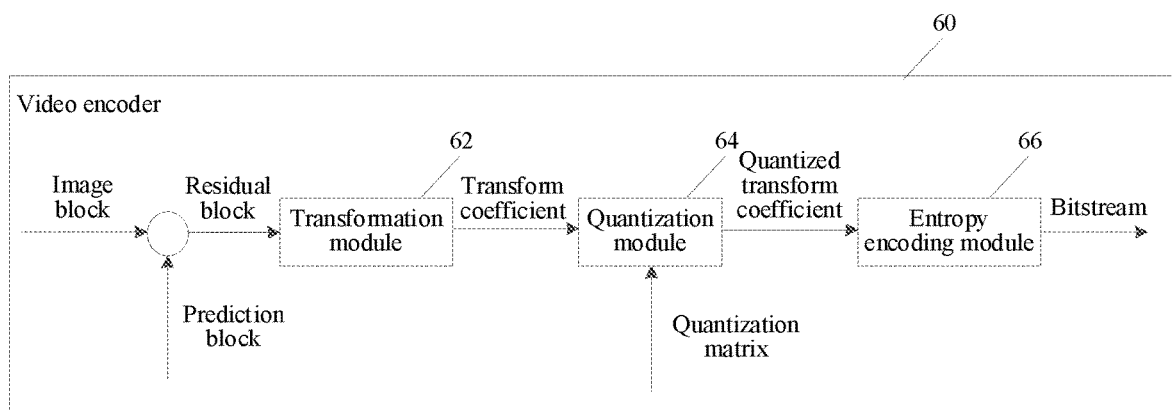
FIG. 6 is a schematic diagram of functional modules of a video encoder according to an embodiment of this disclosure.

FIG. 6 shows a part of an exemplary video encoder 60 including a transform module 62, a quantization module 64, and an entropy encoding module 66. Although not shown in FIG. 6, the video encoder 60 may further include other modules such as a prediction module, a dequantization module, and a reconstruction module. During operation, the video encoder 60 may obtain a video frame, and the video frame may include a plurality of image blocks. For brevity, encoding an image block may be regarded as an example herein. To encode the image block, a prediction block may be first generated as an estimate of the image block. With reference to the above, the prediction block may be generated by the prediction module in the inter-frame prediction mode or the intra-frame prediction mode. Then, a difference between the image block and the prediction block may be calculated to generate a residual block. The residual block may be transformed into transform coefficients by the transform module 62. During a transform, a residual value in a spatial domain includes a large feature and a small feature, and is converted into transform coefficients in a frequency domain. The frequency domain includes a high frequency band and a low frequency band. Then, the quantization module 64 may quantize the transform coefficients by using a QM, to generate quantized transform coefficients. Further, the quantized transform coefficients may be encoded by the entropy encoding module 66, and the encoded quantized transform coefficients as a part of a bitstream are finally sent from the video encoder 60.

Figure 7:
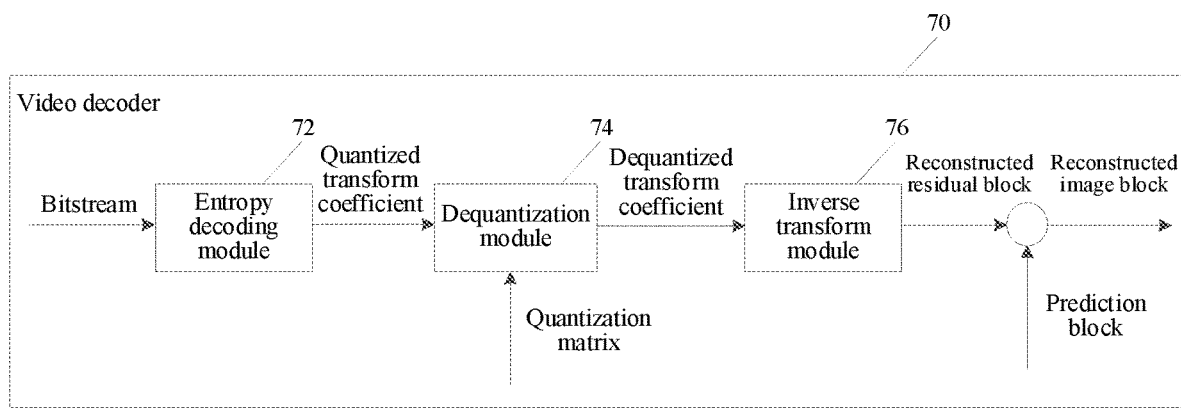
FIG. 7 is a schematic diagram of functional modules of a video decoder according to an embodiment of this disclosure.

FIG. 7 shows a part of an exemplary video decoder 70 including an entropy decoding module 72, a dequantization (inverse quantization) module 74, and an inverse transform module 76. Although not shown in FIG. 7, the video decoder 70 may further include other modules such as a prediction module, a transformation module, and a quantization module. During operation, the video decoder 70 may receive a bitstream outputted from the video encoder 60, decode the bitstream in the inter-frame prediction mode or the intra-frame prediction mode, and output a reconstructed video frame. The entropy decoding module 72 may generate quantized transform coefficients by performing entropy decoding on an input bitstream. The dequantization module 74 may dequantize the quantized transform coefficients based on a QM, to obtain the dequantized transform coefficients. The inverse transform module 76 performs inverse transform on the dequantized transform coefficients, to generate a reconstructed residual block. Then, a reconstructed image block is generated according to the reconstructed residual block and a prediction block.

It can be learned from the above that the QM is an indispensable part during video encoding and decoding. A configuration of the QM may determine how much information about the transform coefficients are retained or filtered out, and therefore, the QM may affect the encoding performance and the encoding quality. Actually, the QM is needed on both the encoder and the decoder. Specifically, to correctly decode an image, information about the quantized coefficients in the QM needs to be encoded on the encoder, and the encoded information is sent from the encoder to the decoder. In video encoding and decoding technologies and standards, the QM may sometimes be referred to as a scaling matrix or a weight matrix. Therefore, the term "QM" used in this specification may be a general term covering a quantization matrix, a scaling matrix, a weight matrix, and another equivalent term.

The following describes some basic concepts involved in the embodiments of this application.

1. BDPCM

BDPCM is an intra-frame coding tool used for video encoding. At a frame sequence level, a BDPCM enable flag is included in a sequence parameter set (SPS); and the flag is encoded and transmitted when a transform skip mode is enabled in the SPS. In a current VVC test model (VTM)-7.0 version, a luma component can enable the BDPCM, but for a chroma component, only a video in a format 4:4:4 can enable the BDPCM.

When the BDPCM is enabled, if a size of a coding unit (CU) is less than or equal to MaxTsSize×MaxTsSize in terms of luma sampling, and the CU is intra-frame coded, a flag is sent at a CU layer, where MaxTsSize is defined as a maximum block size that allows a transform skip mode. This flag indicates whether to use related intra-frame coding or the BDPCM. If the BDPCM is used, a BDPCM prediction direction flag is sent to indicate whether a prediction direction is horizontal or vertical. Then, the block is predicted by using a horizontal or vertical intra-frame prediction process with unfiltered reference samples. The residuals are quantized, and a difference between each quantized residual and a predicted value of each quantized residual is calculated. That is, a previous coding residual at a horizontally or vertically (depending on a BDPCM prediction direction) neighboring position is encoded.

For a block with a size of M (height)×N (width), it is assumed that $r_{i,j}$, $0 \le i \le M-1$, $0 \le j \le N-1$ is a prediction residual. It is assumed that $Q(r_{i,j})$, $0 \le i \le M-1$, $0 \le j \le N-1$ represents a quantized form of the prediction residual $r_{i,j}$. The BDPCM is applied to a quantized residual value, to obtain a modified M×N array $\tilde{R}$ with an element being $\tilde{r}_{i,j}$, where $\tilde{r}_{i,j}$ is predicted from a neighboring quantized residual value. For the vertical BDPCM prediction mode, for $0 \le j \le (N-1)$, $\tilde{r}_{i,j}$ is derived by using the following formula:

$$\tilde{r}_{i,j} = \begin{cases} Q(r_{i,j}), & i = 0 \\ Q(r_{i,j}) - Q(r_{(i-1),j}), & 1 \le i \le (M-1) \end{cases} \qquad \text{Formula 1}$$

For the horizontal BDPCM prediction mode, for $0 \le i \le (M-1)$, $\tilde{r}_{i,j}$ is derived by using the following formula:

$$\tilde{r}_{i,j} = \begin{cases} Q(r_{i,j}), & j = 0 \\ Q(r_{i,j}) - Q(r_{i,(j-1)}), & 1 \le j \le (N-1) \end{cases} \qquad \text{Formula 2}$$

On a decoder side, $Q(r_{i,j})$, $0 \le i \le M-1$, $0 \le j \le N-1$ is reversely calculated by using the foregoing process, specifically as follows:

$$Q(r_{i,j}) = \sum_{k=0}^{i} \tilde{r}_{k,j}, \text{ if the vertical } BDPCM \text{ mode is used} \qquad \text{Formula 3}$$

$$Q(r_{i,j}) = \sum_{k=0}^{i} \tilde{r}_{i,k}, \text{ if the horizontal } BDPCM \text{ mode is used} \qquad \text{Formula 4}$$

An inverse quantized residual $Q^{-1}(Q(r_{i,j}))$ is added to an intra-frame block prediction value to obtain a reconstructed block.

Residual coding that is the same as residual coding in the transform skip mode is used for processing, and the predicted quantized residual value is sent to the decoder. According to a most probable mode (MPM) for future intra-frame mode coding, if the BDPCM prediction direction is horizontal or vertical, the horizontal or vertical prediction mode is stored respectively for the BDPCM-encoded CU.

2. Syntax and Semantic Meanings Related to BDPCM 2.1 Sequence Parameter Set (SPS)

A syntax structure of the SPS may be shown in Table 1 below:

TABLE 1

| seq_parameter_set_rbsp( ) { | Descriptor |
|---|---|
| ... | |
| chroma_format_idc | u(2) |
| if( chroma_format_idc = = 3 ) | |
|   separate_colour_plane_flag | u(1) |
| ... | |
| if( ChromaArrayType != 0) | |
|   qtbtt_dual_tree_intra_flag | u(1) |
| ... | |
| sps_transform_skip_enabled_flag | u(1) |
| if( sps_transform_skip_enabled_flag ) | |
|   sps_bdpcm_enabled_flag | u(1) |
| if( sps_bdpcm_enabled_flag && chroma_format_idc == 3 ) | |
|   sps_bdpcm_chroma_enabled_flag | u(1) |
| ... | |
| } | |
| } | |

A syntax element chroma_format_idc represents a sampling rate of a chroma component relative to a luma component, as shown in Table 2:

TABLE 2

| chroma_format_idc | separate_colour_plane_flag | Chroma format | SubWidth C | SubHeight C |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In the foregoing Table 2, SubWidthC and SubHeightC respectively represent a width and a height of a coding tree unit (CTU) corresponding to the chroma component, and Monochrome represents no chroma component. An example in which chroma_format_idc is equal to 1 is used. A corresponding chroma format being 4:2:0 means that a width of a luma TB is twice a width of a chroma TB, and a height of the luma TB is twice a height of the chroma TB. An example in which chroma_format_idc is equal to 2 is used. A corresponding chroma format being 4:2:2 means that a width of a luma TB is twice a width of a chroma TB, and a height of the luma TB is the same as a height of the chroma TB. An example in which chroma_format_idc is equal to 3 is used. A corresponding chroma format being 4:4:4 means that a width of a luma TB is the same as a width of a chroma TB, and a height of the luma TB is the same as a height of the chroma TB. In addition, chroma_format_idc is equal to 0, and a corresponding chroma format being 4:0:0 means that there is no chroma component.

The flag separate_colour_plane_flag being equal to 1 means that three color components in a chroma format 4:4:4 are encoded separately. The flag separate_colour_plane_flag being equal to 0 means that color components are not encoded separately. When separate_colour_plane_flag is absent, a value is inferred to be equal to 0.

When separate_colour_plane_flag is equal to 1, a coded image is formed by three separate components, and each component is formed by a coded sample of a color plane (Y, Cb, or Cr), and a monochrome coding syntax. In this case, each color plane is associated with a specific value of colour_plane_id.

The variable colour_plane_id specifies a color plane associated with a slice associated with a picture header (PH). When separate_colour_plane_flag is equal to 1, the value of colour_plane_id falls within a range of 0 to 2 (including 0 and 2). The values of colour_plane_id, namely, 0, 1, and 2, correspond to the planes Y, Cb, and Cr respectively. There is no dependency between decoding processes of the color planes having different values of colour_plane_id. For example, a decoding process of monochrome images having one value of color_plan_id does not use any data from monochrome images having different values of color_plan_id for inter-frame prediction.

According to a value of separate_colour_plane_flag, a value of a variable ChromaArrayType is defined as follows.

If separate_colour_plane_flag is equal to 0, ChromaArrayType is set to be equal to chroma_format_idc.

Otherwise (that is, separate_colour_plane_flag is equal to 1), ChromaArrayType is set to be equal to 0.

The flag qtbtt_dual_tree_intra_flag being equal to 1 specifies that for an I-slice, each CTU is split by using an implicit quadtree split into CUs having 64×64 luma samples, and the CUs are roots of two separate coding_tree syntax structures for luma and chroma, where a variable treeType is set to DUAL_TREE_LUMA and DUAL_TREE_CHROMA respectively. qtbtt_dual_tree_intra_flag being equal to 0 specifies that a single coding_tree syntax structure is not used for the I-slice. When qtbtt_dual_tree_intra_flag is absent, a value of qtbtt_dual_tree_intra_flag is inferred to be equal to 0. When the value of qtbtt_dual_tree_intra_flag is equal to or is inferred to be equal to 0, the variable treeType is set to SINGLE_TREE.

When treeType is equal to SINGLE_TREE, coding_unit includes syntax of a luma coding block and two chroma coding blocks. When treeType is equal to DUAL_TREE_LUMA, coding_unit includes syntax of a luma coding block. When treeType is equal to DUAL_TREE_CHROMA, coding_unit includes syntax of two chroma coding blocks.

The flag sps_transform_skip_enabled_flag being equal to 1 specifies that transform_skip_flag may be present in transform unit (TU) syntax. sps_transform_skip_enabled_flag being equal to 0 specifies that transform_skip_flag is absent from the TU syntax.

The flag sps_bdpcm_enabled_flag being equal to 1 specifies that intra_bdpcm_luma_flag may be present in CU syntax used for an intra-frame CU. sps_bdpcm_enable_flag being equal to 0 specifies that intra_bdpcm_luma_flag is absent from the CU syntax of the intra-frame CU. If intra_bdpcm_luma_flag is absent, it is inferred that a value of sps_bdpcm_enabled_flag is equal to 0.

The flag sps_bdpcm_chroma_enabled_flag being equal to 1 specifies that intra_bdpcm_chroma_flag may be present in the CU syntax used for the intra-frame CU. sps_bdpcm_chroma_enabled_flag being equal to 0 specifies that intra_bdpcm_chroma_flag is absent from the CU syntax of the intra-frame CU. If intra_bdpcm_chroma_flag is absent, it is inferred that a value of sps_bdpcm_chroma_enabled_flag is equal to 0.

2.2 Coding Unit (CU)

A CU syntax structure may be shown in Table 3 below:

TABLE 3

| coding_unit( x0, y0, cbWidth, cbHeight, cqtDepth, treeType, modeType ) { | Descriptor |
|---|---|
| ... | |
|     if( sps_bdpcm_enabled_flag && | |
|       cbWidth <= MaxTsSize && cbHeight <= MaxTsSize) | |
|       intra_bdpcm_luma_flag | ae(v) |
|     if( intra_bdpcm_luma_flag ) | |
|       intra_bdpcm_luma_dir_flag | ae(v) |
|     if( !cu_act_enabled_flag ) { | |
|       if( cbWidth <= MaxTsSize && cbHeight <= MaxTsSize && | |
|         sps_bdpcm_chroma_enabled_flag ) { | |
|         intra_bdpcm_chroma_flag | ae(v) |
|         if( intra_bdpcm_chroma_flag ) | |
|           intra_bdpcm_chroma_dir_flag | ae(v) |
|       } | |
|     } | |
| ... | |

TABLE 3-continued

| coding_unit( x0, y0, cbWidth, cbHeight, cqtDepth, treeType, modeType ) { | Descriptor |
|---|---|
|   if( CuPredMode[ chType ][ x0 ][ y0 ] != MODE_INTRA<br>&& !pred_mode_plt_flag &&<br>    general_merge_flag[ x0 ][ y0 ] = = 0 ) {<br>      cu_cbf | ae(v) |
| ...<br>    transform_tree( x0, y0, cbWidth, cbHeight, treeType, chType )<br>...<br>}<br>} | |

The flag intra_bdpcm_luma_flag being equal to 1 specifies that the BDPCM is applied to a current luma coding block at a position (x0, y0). That is, the transform is skipped, and an intra-frame luma prediction mode is specified by intra_bdpcm_luma_dir_flag. intra_bdpcm_luma_flag being equal to 0 specifies that the BDPCM is not applied to the current luma coding block at the position (x0, y0). When intra_bdpcm_luma_flag is absent, a value of intra_bdpcm_luma_flag is inferred to be equal to 0.

For x∈[x0, x0+cbWidth−1], y∈[y0, y0+cbHeight−1], and cIdx=0, a variable BdpcmFlag[x][y][cIdx] is set to be equal to intra_bdpcm_luma_flag.

The flag intra_bdpcm_luma_dir_flag being equal to 0 specifies that the BDPCM prediction direction is horizontal. intra_bdpcm_luma_dir_flag being equal to 1 specifies that the BDPCM prediction direction is vertical.

For x∈[x0, x0+cbWidth−1], y∈[y0, y0+cbHeight−1], and cIdx=0, a variable BdpcmDir[x][y][cIdx] is set to be equal to intra_bdpcm_luma_flag.

The flag intra_bdpcm_chroma_flag being equal to 1 specifies that the BDPCM is applied to a current chroma coding block at a position (x0, y0). That is, the transform is skipped, and an intra-frame chroma prediction mode is specified by intra_bdpcm_chroma_dir_flag. intra_bdpcm_chroma_flag being equal to 0 specifies that the BDPCM is not applied to the current chroma coding block at the position (x0, y0). When intra_bdpcm_chroma_flag is absent, a value of intra_bdpcm_chroma_flag is inferred to be equal to 0.

For x∈[x0, x0+cbWidth−1], y∈[y0, y0+cbHeight−1], and cIdx=1 or 2, a variable BdpcmFlag[x][y][cIdx] is set to be equal to intra_bdpcm_chroma_flag.

The flag intra_bdpcm_chroma_dir_flag being equal to 0 specifies that the BDPCM prediction direction is horizontal. intra_bdpcm_chroma_dir_flag being equal to 1 specifies that the BDPCM prediction direction is vertical.

For x∈[x0, x0+cbWidth−1], y∈[y0, y0+cbHeight−1], and cIdx=1 or 2, the variable BdpcmDir[x][y][cIdx] is set to be equal to intra_bdpcm_chroma_dir_flag.

The variable cu_cbf being equal to 1 specifies that a transform_tree( ) syntax structure used for a current CU is present. cu_cbf being equal to 0 specifies that a transform_tree( ) syntax structure used for a current CU is absent.

When cu_cbf is absent, it is inferred as follows.

If cu_skip_flag[x0][y0] is equal to 1 or pred_mode_plt_flag is equal to 1, it is inferred that cu_cbf is equal to 0.

Otherwise, it is inferred that cu_cbf is equal to 1.

2.3 Transform Unit (TU)

A TU syntax structure may be shown in Table 4 below:

TABLE 4

| transform_unit( x0, y0, tbWidth, tbHeight, treeType, subTuIndex, chType ) { | Descriptor |
|---|---|
| ...<br>  if( ( treeType = = SINGLE_TREE \| \| treeType = = DUAL_TREE_CHROMA )<br>&&<br>    ChromaArrayType != 0 ) {<br>    if( ( IntraSubPartitionsSplitType = = ISP_NO_SPLIT && !( cu_sbt_flag<br>&&<br>      ( ( subTuIndex = = 0 && cu_sbt_pos_flag ) \| \|<br>        ( subTuIndex = = 1 && !cu_sbt_pos_flag ) ) ) ) \| \|<br>    ( IntraSubPartitionsSplitType != ISP_NO_SPLIT &&<br>      ( subTuIndex = = NumIntraSubPartitions − 1 ) ) ) {<br>      tu_cbf_cb[ xC ][ yC ] | ae(v) |
|       tu_cbf_cr[ xC ][ yC ] | ae(v) |
|     }<br>  }<br>  if( treeType = = SINGLE_TREE \| \| treeType = = DUAL_TREE_LUMA ) {<br>    if( ( IntraSubPartitionsSplitType = = ISP_NO_SPLIT && !( cu_sbt_flag<br>&&<br>      ( ( subTuIndex = = 0 && cu_sbt_pos_flag ) \| \|<br>        ( subTuIndex = = 1 && !cu_sbt_pos_flag ) ) ) &&<br>      ( CuPredMode[ chType ][ x0 ][ y0 ] = = MODE_INTRA \| \|<br>        ( chromaAvailable && ( tu_cbf_cb[ xC ][ yC ] \| \|<br>tu_cbf_cr[ xC ][ yC ] ) ) \| \|<br>        CbWidth[ chType ][ x0 ][ y0 ] > MaxTbSizeY \| \|<br>        CbHeight[ chType ][ x0 ][ y0 ] > MaxTbSizeY ) ) \| \|<br>    ( IntraSubPartitionsSplitType != ISP_NO_SPLIT &&<br>      ( subTuIndex < NumIntraSubPartitions − 1 \| \| !InferTuCbfLuma ) ) )<br>      tu_cbf_luma[ x0 ][ y0 ] | ae(v) |
|   }<br>... | |

TABLE 4-continued

| transform unit( x0, y0, tbWidth, tbHeight, treeType, subTuIndex, chType ) { | Descriptor |
|---|---|
|   if( tu_cbf luma[ x0 ][ y0 ] && treeType != DUAL_TREE_CHROMA ) { | |
|     if( sps_transform_skip_enabled_flag && !BdpcmFlag[ x0 ][ y0 ][ 0 ] && | |
|       tbWidth <= MaxTsSize && tbHeight <= MaxTsSize && | |
|       ( IntraSubPartitionsSplit[ x0 ][ y0 ] = = ISP_NO_SPLIT ) | |
| && !cu_sbt_flag ) | |
|     transform_skip_flag[ x0 ][ y0 ][ 0 ] | ae(v) |
|     if( !transform_skip_flag[ x0 ][ y0 ][ 0 ] ) | |
|       residual_coding( x0, y0, Log2( tbWidth ), Log2( tbHeight ), 0 ) | |
|     Else | |
|       residual_ts_coding( x0, y0, Log2( tbWidth ), Log2( tbHeight ), 0 ) | |
|   } | |
|   if( tu_cbf_cb[ xC ][ yC ] && treeType != DUAL_TREE_LUMA ) { | |
|     if( sps_transform_skip_enabled_flag && !BdpcmFlag[ x0 ][ y0 ][ 1 ] && | |
|       wC <= MaxTsSize && hC <= MaxTsSize | |
| && !cu_sbt_flag ) | |
|     transform_skip_flag[ xC ][ yC ][ 1 ] | ae(v) |
|     if( !transform_skip_flag[ xC ][ yC ][ 1 ] ) | |
|       residual_coding( xC, yC, Log2( wC), Log2( hC), 1 ) | |
|     Else | |
|       residual_ts_coding( xC, yC, Log2( wC), Log2( hC), 1 ) | |
|   } | |
|   if( tu_cbf cr[ xC ][ yC ] && treeType != DUAL_TREE_LUMA && | |
|     !( tu_cbf cb[ xC ][ yC ] && tujoint_cbcr_residual_flag[ xC ][ yC ] ) ) { | |
|     if( sps_transform_skip_enabled_flag && !BdpcmFlag[ x0 ][ y0 ][ 2 ] && | |
|       wC <= MaxTsSize && hC <= MaxTsSize | |
| && !cu_sbt_flag ) | |
|     transform_skip_flag[ xC ][ yC ][ 2 ] | ae(v) |
|     if( !transform_skip_flag[ xC ][ yC ][ 2 ] ) | |
|       residual_coding( xC, yC, Log2( wC), Log2( hC), 2 ) | |
|     else | |
|       residual_ts_coding( xC, yC, Log2( wC ), Log2( hC ), 2 ) | |
|   } | |
| } | |

The variable tu_cbf_cb[x0][y0] being equal to 1 specifies that a Cb TB includes one or more transform coefficients that are not equal to 0. Matrix indexes x0 and y0 specify an upper left corner position (x0, y0) of the considered TB. When tu_cbf_cb[x0][y0] is absent, a value of tu_cbf_cb[x0][y0] is inferred to be equal to 0.

The variable tu_cbf_cr[x0][y0] being equal to 1 specifies that a Cr TB includes one or more transform coefficients that are not equal to 0. Matrix indexes x0 and y0 specify an upper left corner position (x0, y0) of the considered TB. When tu_cbf_cr[x0][y0] is absent, a value of tu_cbf_cr[x0][y0] is inferred to be equal to 0.

The variable tu_cbf_luma[x0][y0] being equal to 1 specifies that a luma TB includes one or more transform coefficients that are not equal to 0. The matrix indexes x0 and y0 specify a position (x0, y0) of a luma sample at an upper left corner of the considered TB relative to a luma sample at an upper left corner of an image. When tu_cbf_luma[x0][y0] is absent, a value of tu_cbf_luma[x0][y0] is inferred as follows.

If tu_cbf_luma[x0][y0] is equal to 1, and one of the following conditions is true, it is inferred that tu_cbf_luma[x0][y0] is equal to 0:
  subTuIndex is equal to 0 and cu_sbt_pos_flag is equal to 1.
  subTuIndex is equal to 1 and cu_sbt_pos_flag is equal to 0.
  Otherwise, if treeType is equal to DUAL_TREE_CHROMA, it is inferred that tu_cbf_luma[x0][y0] is equal to 0.

Otherwise, tu_cbf_luma[x0][y0] is inferred to be equal to 1.

The flag transform_skip_flag[x0][y0][cIdx] specifies whether to apply the transform to an associated TB. The matrix indexes x0 and y0 specify a position (x0, y0) of a luma sample at an upper left corner of the considered TB relative to a luma sample at an upper left corner of a picture. The matrix index cIdx specifies an indicator of a color component; and Y is equal to 0, Cb is equal to 1, and Cr is equal to 2. transform_skip_flag[x0][y0][cIdx] being equal to 1 specifies that no transform is applied to the associated TB. transform_skip_flag[x0][y0][cIdx] being equal to 0 specifies that whether to apply the transform to the associated TB depends on other syntax elements.

When transform_skip_flag[x0][y0][cIdx] is absent, it is inferred as follows.

If BdpcmFlag[x0][y0][cIdx] is equal to 1, it is inferred that transform_skip_flag[x0][y0][cIdx] is equal to 1.

Otherwise (that is, BdpcmFlag[x0][y0][cIdx] is equal to 0), it is inferred that transform_skip_flag[x0][y0][cIdx] is equal to 0.

2.4 Residual Coding for Transform Skip Block

For the predicted quantized residual value $\tilde{r}_{i,j}$ in the BDPCM, a process having residual coding the same as the residual coding in the transform skip mode is used for sending data. The following Table 5 is syntax of residual coding in the transform skip mode.

TABLE 5

| residual_ts_coding( x0, y0, log2TbWidth, log2TbHeight, cIdx ) { | Descriptor |
|---|---|
|   log2SbW = ( Min( log2TbWidth, log2TbHeight ) <2 ? 1 : 2 ) | |
|   log2SbH = log2SbW | |
|   if( log2TbWidth + log2TbHeight > 3 ) { | |
|     if( log2TbWidth < 2 ) { | |
|       log2SbW = log2TbWidth | |
|       log2SbH = 4 − log2SbW | |
|     }else if( log2TbHeight < 2 ) { | |
|       log2SbH = log2TbHeight | |
|       log2SbW = 4 − log2SbH | |
|     } | |
|   } | |
|   numSbCoeff = 1 << ( log2SbW + log2SbH ) | |
|   lastSubBlock = | |
| ( 1 << ( log2TbWidth + log2TbHeight − ( log2SbW+log2SbH ) ) ) − 1 | |
|   inferSbCbf = 1 | |
|   RemCcbs = ( ( 1 << ( log2TbWidth + log2TbHeight ) ) * 7 ) >> 2 | |
|   for( i =0; i <= lastSubBlock; i++ ) { | |
|     xS = | |
| DiagScanOrder[ log2TbWidth − log2SbW ][ log2TbHeight − log2SbH ][ i ][ 0 ] | |
|     yS = | |
| DiagScanOrder[ log2TbWidth − log2SbW ][ log2TbHeight − log2SbH ][ i ][ 1 ] | |
|     if( i != lastSubBlock || !inferSbCbf ) { | |
|       coded_sub_block_flag[ xS ][ yS ] | ae(v) |
|     } | |
|     if( coded_sub_block_flag[ xS ][ yS ] && i < lastSubBlock ) | |
|       inferSbCbf = 0 | |
|   /* First scan pass */ | |
|     inferSbSigCoeffFlag = 1 | |
|     lastScanPosPass 1 = −1 | |
|     for( n = 0; n <= numSbCoeff − 1 && RemCcbs >= 4; n++ ) { | |
|       xC = ( xS << log2SbW) + DiagScanOrder[ log2SbW ][ log2SbH ][ n ][ 0 ] | |
|       yC = ( yS << log2SbH) + DiagScanOrder[ log2SbW ][ log2SbH ][ n ][ 1 ] | |
|       if( coded_sub_block_flag[ xS ][ yS ] && | |
|         ( n != numSbCoeff − 1 || !inferSbSigCoeffFlag ) ) { | |
|         sig_coeff_flag[ xC ][ yC ] | ae(v) |
|         RemCcbs− − | |
|         if( sig_coeff_flag[ xC ][ yC ] ) | |
|           inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         RemCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         RemCcbs− − | |
|         if( abs_level_gtx_flag[ n ][ 0 ] ) { | |
|           par_level_flag[ n ] | ae(v) |
|           RemCcbs− − | |
|         } | |
|       } | |
|       AbsLevelPass1[ xC ][ yC ] = | |
|         sig_coeff_flag[ xC ][ yC ] + par_level_flag[ n ] + abs_level_gtx_flag[ n ][ 0 ] | |
|       lastScanPosPass1 = n | |
|     } | |
|   /* Greater than X scan pass (numGtXPlags=5) */ | |
|     lastScanPosPass2 = −1 | |
|     for( n = 0; n <= numSbCoeff − 1 && RemCcbs >= 4; n++ ) { | |
|       xC = ( xS << log2SbW) + DiagScanOrder[ log2SbW ][ log2SbH ][ n ][ 0 ] | |
|       yC = ( yS << log2SbH) + DiagScanOrder[ log2SbW ][ log2SbH ][ n ][ 1 ] | |
|       AbsLevelPass2[ xC ][ yC ] = AbsLevelPass1[ xC ][ yC ] | |
|       for(j = 1;j < 5; j++ ) { | |
|         if( abs_level_gtx_flag[ n ][j − 1 ] ) { | |
|           abs_level_gtx_flag[ n ][ j ] | ae(v) |
|           RemCcbs− − | |
|         } | |
|         AbsLevelPass2[ xC ][ yC ] + = 2 * abs_level_gtx_flag[ n ][ j ] | |
|       } | |
|       lastScanPosPass2 = n | |
|     } | |

TABLE 5-continued

| residual_ts_coding( x0, y0, log2TbWidth, log2TbHeight, cIdx ) { | Descriptor |
|---|---|
|   /* remainder scan pass */ | |
|   for( n = 0; n <= numSbCoeff − 1; n++ ) { | |
|     xC = ( xS << log2SbW ) + DiagScanOrder[ log2SbW ][ log2SbH ][ n ][ 0 ] | |
|     yC = ( yS << log2SbH ) + DiagScanOrder[ log2SbW ][ log2SbH ][ n ][ 1 ] | |
|     if( ( n <= lastScanPosPass2 && AbsLevelPass2[ xC ][ yC ] >= 10 ) | | | |
|       ( n > lastScanPosPass2 && n <= lastScanPosPass1 && | |
|         AbsLevelPass1[ xC ][ yC ] >= 2 ) | | | |
|       ( n > lastScanPosPass1 && coded_sub_block_flag[ xS ][ yS ] ) ) | |
|       abs_remainder[ n ] | ae(v) |
|     if( n <= lastScanPosPass2 ) | |
|       AbsLevel[ xC ][ yC ] = | |
| AbsLevelPass2[ xC ][ yC ] + 2 * abs_remainder[ n ] | |
|     else if(n <= lastScanPosPass1 ) | |
|       AbsLevel[ xC ][ yC ] = | |
| AbsLevelPass1[ xC ][ yC ] + 2 * abs_remainder[ n ] | |
|     else { /* bypass | |
|       AbsLevel[ xC ][ yC ] = abs_remainder[ n ] | |
|       if( abs_remainder[ n ] ) | |
|         coeff_sign_flag[ n ] | ae(v) |
|     } | |
|     if( BdpcmFlag[ x0 ][ y0 ][ cIdx ] = = 0 && n <= | |
| lastScanPosPass1 ) { | |
|       absLeftCoeff = xC > 0 ? AbsLevel[ xC − 1 ][ yC ] ) : 0 | |
|       absAboveCoeff = yC > 0 ? AbsLevel[ xC ][ yC − 1 ] ) : 0 | |
|       predCoeff = Max( absLeftCoeff, absAboveCoeff ) | |
|       if( AbsLevel[ xC ][ yC ] = = 1 && predCoeff > 0 ) | |
|         AbsLevel[ xC ][ yC ] = predCoeff | |
|       else if( AbsLevel[ xC ][ yC ] > 0 && | |
|         AbsLevel[ xC ][ yC ] <= predCoeff ) | |
|         AbsLevel[ xC ][ yC ] −= 1 | |
|     } | |
|   } | |
|   TransCoeffLevel[ x0 ][ y0 ][ cIdx ][ xC ][ yC ] = ( 1 − 2 * | |
| coeff_sign_flag[ n ] ) * | |
|           AbsLevel[ xC ][ yC ] | |
|   } | |
| } | |

Variables CoeffMin and CoeffMax specify minimum and maximum transform coefficient values, and are derived as follows:

$$\text{CoeffMin} = -(1 << 15) \quad \text{Formula 5}$$

$$\text{CoeffMax} = (1 << 15) - 1 \quad \text{Formula 6}$$

where << is a left shift operator.

An array QStateTransTable[ ][ ] specifies the following:

$$\text{QStateTransTable}[\ ][\ ] = \{\{0,2\},\{2,0\},\{1,3\},\{3,1\}\} \quad \text{Formula 7}$$

The variable last_sig_coeff_x_prefix specifies a prefix of a column position of the last effective coefficient in a scanning order within a TB. A value of last_sig_coeff_x_prefix falls within a range of 0 to (log 2ZoTbWidth<<1)−1, including 0 and (log 2ZoTbWidth<<1)−1. When last_sig_coeff_x_prefix is absent, the value of last_sig_coeff_x_prefix is inferred to be 0.

The variable last_sig_coeff_y_prefix specifies a prefix of a row position of the last effective coefficient in a scanning order within a TB. A value of last_sig_coeff_y_prefix falls within a range of 0 to (log 2ZoTbHeight<<1)−1, including 0 and (log 2ZoTbHeight<<1)−1. When last_sig_coeff_y_prefix is absent, the value of last_sig_coeff_y_prefix is inferred to be 0.

The variable last_sig_coeff_x_suffix specifies a suffix of a column position of the last effective coefficient in a scanning order within a TB. A value of last_sig_coeff_x_suffix falls within a range of 0 to (1<<((last_sig_coeff_x_prefix>>1)−1))−1, including 0 and (1<<((last_sig_coeff_x_prefix>>1)−1))−1. A column position of the last effective coefficient in a scanning order within a TB LastSignsignantCoeffX is derived as follows.

If last_sig_coeff_x_suffix is absent, Formula 8 shown below is used:

$$\text{LastSignificantCoeffX} = \text{last\_sig\_coeff\_x\_prefix} \quad \text{Formula 8}$$

Otherwise, when last_sig_coeff_x_suffix is present, the Formula 9 shown below is used:

$$\text{LastSignificantCoeffX} = (1 << ((\text{last\_sig\_coeff\_x\_prefix} >> 1) - 1)) * (2 + (\text{last\_sig\_coeff\_x\_prefix} \& 1)) + \text{last\_sig\_coeff\_x\_suffix} \quad \text{Formula 9}$$

The variable last_sig_coeff_y suffix specifies a suffix of a row position of the last effective coefficient in a scanning order within a TB. A value of last_sig_coeff_y suffix falls within a range of 0 to (1<<((last_sig_coeff_y_prefix>>1)−1))−1, including 0 and (1<<((last_sig_coeff_y_prefix>>1)−1))−1. A row position of the last effective coefficient in a scanning order within a TB LastSignsignantCoeffY is derived as follows.

If last_sig_coeff_y suffix is absent, the Formula 10 shown below is used:

$$\text{LastSignificantCoeffY} = \text{last\_sig\_coeff\_y\_prefix} \quad \text{Formula 10}$$

Otherwise, when that is, last_sig_coeff_y suffix is present, Formula 11 shown below is used:

$$\text{LastSignificantCoeffY} = (1 << ((\text{last\_sig\_coeff\_y\_prefix} >> 1) - 1)) * (2 + (\text{last\_sig\_coeff\_y\_prefix} \& 1)) + \text{last\_sig\_coeff\_y\_suffix} \quad \text{Formula 11}$$

The flag coded_sub_block_flag[xS][yS] specifies the following content for a subblock at a position (xS, yS) within a current TB, where the subblock is a (4×4) array of 16 transform coefficients:

If coded_sub_block_flag[xS][yS] is equal to 0, it is inferred that the 16 transform coefficients of the subblock at the position (xS, yS) are equal to 0.

Otherwise (that is, coded_sub_block_flag[xS][yS] is equal to 1), the following case is applicable.

If (xS, yS) is equal to (0, 0), and (LastSignificantCoeffX, LastSignificantCoeffY) is not equal to (0, 0), at least one of the 16 sig coeff flag syntax elements is present in the subblock at the position (xS, yS).

Otherwise, the at least one of the 16 transform coefficients of the subblock at the position (xS, yS) has a non-zero value.

When coded_sub_block_flag[xS][yS] is absent, a value of coded_sub_block_flag[xS][yS] is inferred to be equal to 1.

The flag sig_coeff_flag[xC][yC] specifies, for transform coefficient at a position (xC, yC) within a current TB, whether corresponding transform coefficients at the position (xC, yC) are non-zero, as shown below.

If sig_coeff_flag[xC][yC] is equal to 0, the transform coefficients at the position (xC, yC) are set to be equal to 0.

Otherwise (that is, sig_coeff_flag[xC][yC] is equal to 1), the transform coefficients at the position (xC, yC) are non-zero.

When sig_coeff_flag[xC][yC] is absent, it is inferred as follows:

If (xC, yC) is the last effective position (LastSignificantCoeffX, LastSignificantCoeffY) in a scanning order, or all the following conditions are true, it is inferred that sig_coeff_flag[xC][yC] is equal to 1:

(xC & ((1<<log 2SbW)−1), yC & ((1<<log 2SbH)−1)) is equal to (0, 0).

inferSbDcSigCoefiFlag is equal to 1.

coded_sub_block_flag[xS][yS] is equal to 1.

Otherwise, it is inferred that sig_coeff_flag[xC][yC] is equal to 0.

The flag abs_level_gtx_flag[n][j] specifies whether an absolute value of a transform coefficient (at a scanning position n) is greater than (j<<1)+1. When abs_level_gtx_flag[n][j] is absent, a value of abs_level_gtx_flag[n][j] is inferred to be equal to 0.

The flag par_level_flag[n] specifies a parity check of the transform coefficient at the scanning position n. When par_level_flag[n] is absent, a value of par_level_flag[n] is inferred to be equal to 0.

The variable abs_remainder[n] is a remaining absolute value of a transform coefficient level encoded with Golomb-Rice code at the scanning position n. When abs_remainder[n] is absent, a value of abs_remainder[n] is inferred to be equal to 0.

For bitstream consistency, the value of abs_remainder[n] needs to be constrained, so that a corresponding value of TransCoeffLevel[x0][y0][cIdx][xC][yC] falls within a range of CoeffMin to CoeffMax (including CoeffMin and CoeffMax).

The variable dec_abs_level[n] is an intermediate value encoded with the Golomb-Rice code at the scanning position n. ZeroPos[n] derived during the parsing of dec_abs_level[n] is given, and an absolute value AbsLevel[xC][yC] of a transform coefficient at a position (xC, yC) is derived as follows.

If dec_abs_level[n] is absent or is equal to ZeroPos[n], then AbsLevel[xC][yC] is set to be equal to 0.

Otherwise, if dec_abs_level[n] is less than ZeroPos[n], AbsLevel[xC][yC] is set to dec_abs_level[n]+1.

Otherwise (that is, dec_abs_level[n] is greater than ZeroPos[n]), AbsLevel[xC][yC] is set to be equal to dec_abs_level[n].

For bitstream consistency, the value of dec_abs_level[n] is constrained, so that a corresponding value of TransCoeffLevel[x0][y0][cIdx][xC][yC] falls within a range of CoeffMin to CoeffMax (including CoeffMin and CoeffMax).

The flag coeff_sign_flag[n] specifies a symbol of the transform coefficient level at the scanning position n as follows.

If coeff_sign_flag[n] is equal to 0, a corresponding transform coefficient is a positive value.

Otherwise (that is, coeff_sign_flag[n] is equal to 1), a corresponding transform coefficient is a negative value.

When coeff_sign_flag[n] is absent, a value of coeff_sign_flag[n] is inferred to be equal to 0.

A value of CoeffSignLevel[xC][yC] specifies a symbol of the transform coefficient at the position (xC, yC), as shown below.

If CoeffSignLevel[xC][yC] is equal to 0, a corresponding transform coefficient is equal to 0.

Otherwise, if CoeffSignLevel[xC][yC] is equal to 1, a corresponding transform coefficient is a positive value.

Otherwise (that is, CoeffSignLevel[xC][yC] is equal to −1), a corresponding transform coefficient is a negative value.

3. Method for Decoding BDPCM Residual Block

A process of decoding an intra-frame prediction block includes the following four steps.

1. Decode intra-frame prediction mode information from coding_unit( )).
2. Decode an intra-frame prediction residual block res[x][y] from residual_unit( ) or residual_ts_unit( ).
3. Derive a prediction block pred[x][y] according to the decoded intra-frame prediction mode information by using intra-frame prediction.
4. Obtain a reconstruction block through intra-frame compensation by adding the residual block res[x][y] to the prediction block pred[x][y].

A process of decoding a BDPCM coding block also follows the foregoing process. As described above, when the BDPCM is applied to the quantized residual value, a process of deriving a residual block of the quantized residual value is different from that in a normal intra-frame prediction mode. Details are provided as follows.

The following formulas are applicable to derivation of the residual block res[x][y] of the BDPCM coding block of x∈[0, nTbW−1], and y∈[0, nTbH−1]:

For a process of deriving BdpcmFlag[x][y][cIdx] and BdpcmDir[x][y][cIdx], refer to the foregoing part 2.2.

A process of deriving tu_cbf_luma(cIdx=0), tu_cbf_cb (cIdx=1), and tu_cbf_cr(cIdx=2) is in the TU in the foregoing part 2.3.

The following conditions are applicable to each color component cIdx, where cIdx falls within a range of 0 to 2 (including 0 and 2).

If a value of a corresponding cbf of the current color component is equal to 0, the residual block res[x][y] is set to 0.

Otherwise, a transform coefficient matrix TransCoeffLevel[xTbY][yTbY] is derived from residual_ts_unit( ) described in the foregoing part 2.4.

TransCoeffLevel[x][y] is modified according to BdpcmDir, as shown below.

An (nTbW)×(nTbH) array dz is set to be equal to an (nTbW)×(nTbH) array TransCoeffLevel[xTbY][yTbY][cIdx].

When BdpcmFlag[xTbY][yYbY][cIdx] is equal to 1, dz[x][y] is modified as follows:

If BdpcmDir[xTbY][yYbY][cIdx] is equal to 0, and x is greater than 0, the following conditions are applicable:

$$dz[x][y]=\text{Clip3}(\text{CoeffMin},\text{CoeffMax},dz[x-1][y]+dz[x][y]) \quad \text{Formula 12}$$

Otherwise, if BdpcmDir[xTbY][yYbY][cIdx] is equal to 1, and y is greater than 0, the following conditions are applicable:

$$dz[x][y]=\text{Clip3}(\text{CoeffMin},\text{CoeffMax},dz[x][y]-1+dz[x][y]) \quad \text{Formula 13}$$

A value of dnc[x][y] is derived as follows:

$$dnc[x][y]=(dz[x][y]*ls[x][y]+bd\text{Offset})>>bd\text{Shift} \quad \text{Formula 14}$$

where >> is a right shift operator.

A scaling transform coefficient d[x][y] is derived as follows:

$$d[x][y]=\text{Clip3}(\text{CoeffMin},\text{CoeffMax},dnc[x][y]) \quad \text{Formula 15}$$

res[x][y] is derived from an output of a dequantization process on d[x][y].

Figure 8:
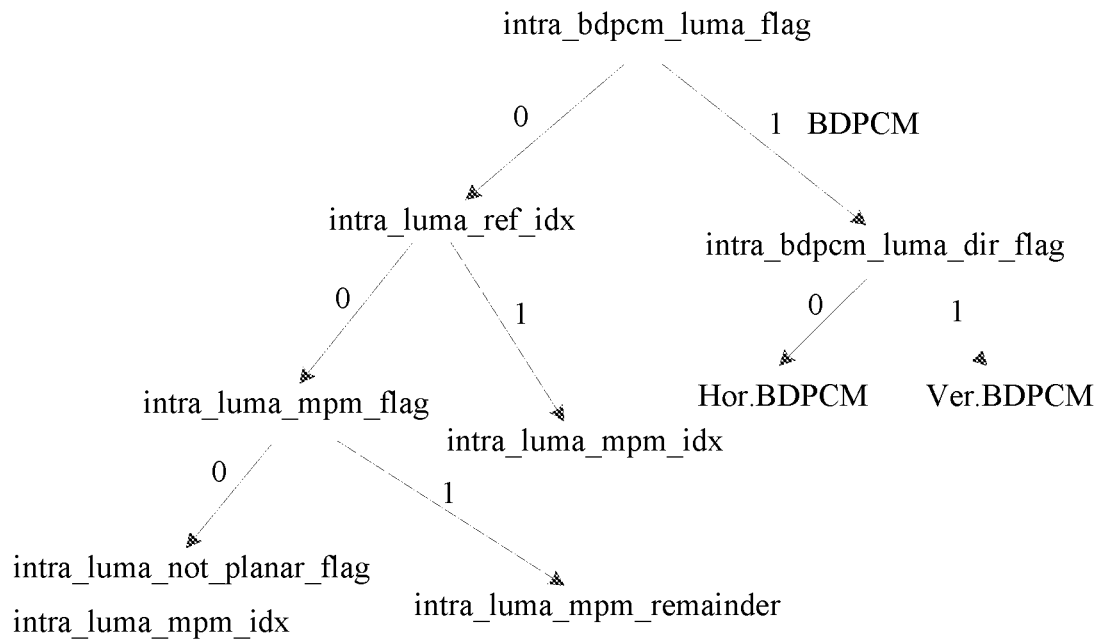
FIG. 8 and FIG. 9 are respectively schematic diagrams of a comparison between a BDPCM mode and a normal intra-frame coding mode of a luma coding block and a comparison between a BDPCM mode and a normal intra-frame coding mode of a chroma coding block.
Figure 9:
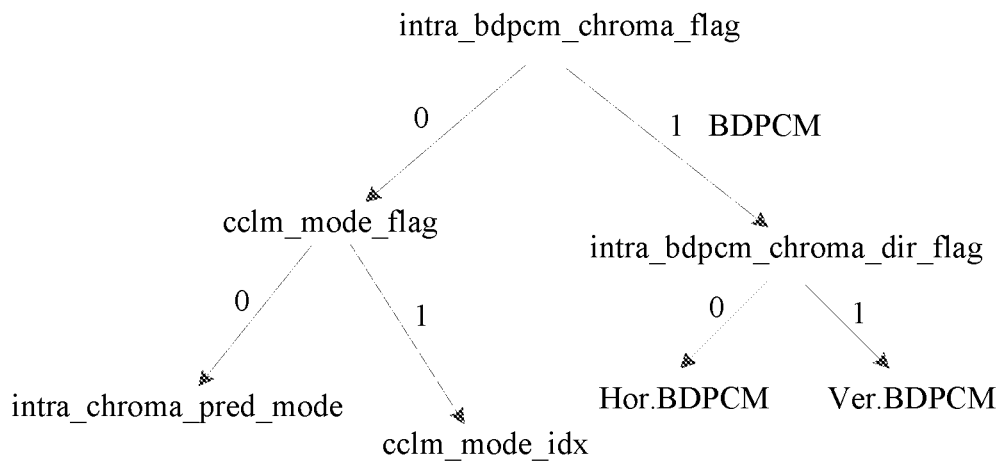

4. BDPCM Mode and Normal Intra-Frame Vertical/Horizontal (Hor./Ver.) Coding Mode FIG. 8 and FIG. 9 respectively show a comparison between a BDPCM mode and a normal intra-frame coding mode of a luma coding block and a comparison between a BDPCM mode and a normal intra-frame coding mode of a chroma coding block. As shown, the BDPCM mode may be indicated by using 2 flag syntax elements (that is, intra_bdpcm_luma_flag and intra_bdpcm_luma_dir_flag for luma, and intra_bdpcm_chroma_flag and intra_bdpc_chroma_dir_flag for chroma). According to another aspect, for the luma coding block, the normal intra-frame vertical and horizontal coding modes use a bit to indicate a reference pixel row index, an MPM flag, an MPM index, a plane flag, or an MPM remainder; and for the chroma coding block, a bit is used for indicating a cross-component linear model prediction (CCLM) flag, a CCLM index, or a chroma prediction mode. Thus, BDPCM signaling uses fewer bits than that in the normal intra-frame vertical and horizontal coding modes. In addition, evaluation of a RD cost (J) in coding mode selection is as follows:

$$J=D+\lambda \times R \quad \text{Formula 16}$$

where D represents a distortion between an original coding block and a reconstructed coding block (also referred to as a "reconstruction block"), R represents a bit cost, and λ is a Lagrangian multiplier used for compromising the distortion and the bit cost. It can be considered that after the horizontal or vertical intra-frame prediction, the blocks have zero distortion. It can be inferred that according to the RD evaluation, the blocks tend to select the BDPCM mode as a best mode. As a result, in the BDPCM mode, an all-zero residual block corresponding to the luma coding block or the chroma coding block is very likely to be encoded.

In a current VVC, different from the coding blocks using the normal intra-frame coding mode, a probability of the all-zero residual blocks in the coding blocks using the BDPCM mode is relatively high. The all-zero residual block is a residual block that includes residual coefficients being all 0. There are two main reasons as follows: One reason is that a considerable quantity of coding blocks in a video image have relatively small changes, resulting in all-zero residual blocks; and a second reason is that bit consumption of encoding in the BDPCM mode is lower than that of the normal intra-frame coding mode. Therefore, for most of the residual blocks being all-zero coding blocks, the BDPCM mode is selected as an optimal coding mode. Because of the relatively high probability of the all-zero residual blocks in the BDPCM coding blocks, residual coding and decoding modes the same as the normal intra-frame coding mode are still used, resulting in low efficiency in encoding and decoding of the image blocks using the BDPCM mode.

In the technical solutions provided in the embodiments of this disclosure, for a CU (or a decoding unit) using a BDPCM mode, first identification information indicates whether a TB corresponding to the CU (or the decoding unit) includes a non-zero transform coefficient. If the first identification information indicates that the TB corresponding to the CU (or the decoding unit) does not include any non-zero transform coefficient, an encoder side does not need to encode a transform tree syntax structure corresponding to the CU to encode and transmit a residual block, and correspondingly, a decoder side either does not need to decode a transform tree syntax structure corresponding to the decoding unit to decode and obtain a residual block, and may directly determine that the residual block corresponding to the decoding unit is an all-zero residual block, thereby improving the encoding and decoding efficiency of the CU using the BDPCM mode.

The technical solutions provided in the embodiments of this disclosure may be applied to the H.266/VCC standards or the next-generation video codec standards. This is not limited in this embodiment of this disclosure.

In the video decoding method provided in the embodiments of this disclosure, the steps are performed by the decoder-side device, and the steps in the video encoding method provided in the embodiments of this disclosure are performed by an encoder-side device. The decoder-side device and the encoder-side device may each be a computer device. The computer device is an electronic device having data computing, processing, and storage capabilities, for example, a personal computer (PC), a mobile phone, a tablet computer, a media player, a dedicated video conferencing device, or a server.

In addition, the method provided in this application may be used alone or in combination with other methods in any order. Based on the encoder and the decoder in the method provided in this disclosure, the method may be implemented by using processing circuitry, e.g., one or more processors or one or more integrated circuits. The technical solutions of this disclosure are described below by using several embodiments.

Figure 10:
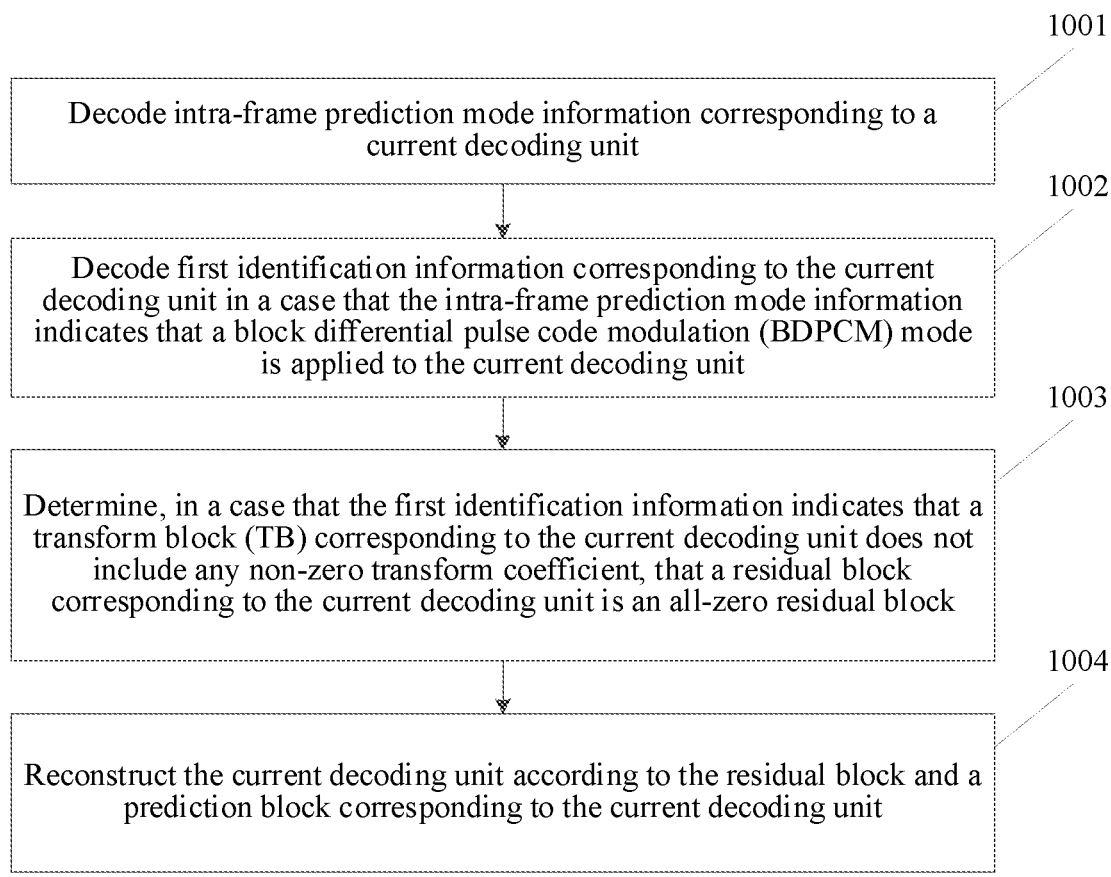
FIG. 10 is a flowchart of a video decoding method according to an embodiment of this disclosure.

FIG. 10 is a flowchart of a video decoding method according to an embodiment of this disclosure. In this embodiment, descriptions are made mainly by using an example in which the method is applicable to the decoder-side device described above. The method may include the following steps (1001 to 1004).

In Step 1001, intra-frame prediction mode information corresponding to a current decoding unit is decoded.

The current decoding unit may be any decoding unit in currently decoded video frames. The intra-frame prediction mode information is used for indicating whether the current decoding unit uses a BDPCM mode or a normal intra-frame coding mode. If the intra-frame prediction mode information indicates that the BDPCM mode is applied to the current decoding unit, that is, the current decoding unit uses the BDPCM mode for encoding, step 1002 is performed. For descriptions of the BDPCM mode and the normal intra-frame coding mode, reference may be made to the above, and details are not described herein again.

One decoding unit may include a plurality of decoding blocks, for example, decoding blocks including one or more different color components. When a coding tree type corresponding to the current decoding unit is DUAL_TREE_LUMA, the current decoding unit includes only one luma decoding block. When the coding tree type corresponding to the current decoding unit is DUAL_TREE_CHROMA, the current decoding unit includes only two chroma decoding blocks. When the coding tree type corresponding to the current decoding unit is SINGLE_TREE, the current decoding unit includes one luma decoding block and two chroma decoding blocks. The two chroma decoding blocks are a Cb chroma decoding block and a Cr chroma decoding block respectively.

The intra-frame prediction mode information can be present in a CU syntax structure. The decoder-side device obtains the intra-frame prediction mode information by decoding the CU syntax structure.

The intra-frame prediction mode information can include a first syntax element and a second syntax element. The first syntax element is used for indicating whether to apply the BDPCM mode to the current luma decoding block when the current decoding unit includes the luma decoding block. The second syntax element is used for indicating whether to apply the BDPCM mode to the current chroma decoding block when the current decoding unit includes the chroma decoding block. In one embodiment, the first syntax element is intra_bdpcm_luma_flag, intra_bdpcm_luma_flag being equal to 1 indicates that the BDPCM mode is applied to the current luma decoding block, and intra_bdpcm_luma_flag being equal to 0 indicates that the BDPCM mode is not applied to the current luma decoding block. In one embodiment, the second syntax element is intra_bdpcm_chroma_flag, intra_bdpcm_chroma_flag being equal to 1 indicates that the BDPCM mode is applied to the current chroma decoding block, and intra_bdpcm_chroma_flag being equal to 0 indicates that the BDPCM mode is not applied to the current chroma decoding block.

In Step 1002, first identification information corresponding to the current decoding unit is decoded when the intra-frame prediction mode information indicates that a BDPCM mode is applied to the current decoding unit.

In an example, the decoder side device decodes first identification information corresponding to the current decoding unit when the intra-frame prediction mode information indicates that a BDPCM mode is applied to the current decoding unit.

In another example, the decoder-side device decodes the first identification information corresponding to the current decoding unit when the intra-frame prediction mode information indicates that the BDPCM mode is applied to the current decoding unit, and all the color components of the current decoding unit use the BDPCM mode. That all the color components of the current decoding unit use the BDPCM mode means that decoding blocks of all the color components included in the current decoding unit use the BDPCM mode. For example, when the coding tree type corresponding to the current decoding unit is DUAL_TREE_LUMA, if the current decoding unit includes only one luma decoding block, the first identification information corresponding to the current decoding unit is decoded when the luma decoding block uses the BDPCM mode. When the coding tree type corresponding to the current decoding unit is DUAL_TREE_CHROMA, if the current decoding unit includes only two chroma decoding blocks, the first identification information corresponding to the current decoding unit is decoded when the two chroma decoding blocks both use the BDPCM mode. When the coding tree type corresponding to the current decoding unit is SINGLE_TREE, if the current decoding unit includes one luma decoding block and two chroma decoding blocks, the first identification information corresponding to the current decoding unit is decoded when the one luma decoding block and the two chroma decoding blocks all use the BDPCM mode.

The first identification information is used for indicating whether the TB corresponding to the current decoding unit includes a non-zero transform coefficient. In one embodiment, the first identification information being equal to 1 indicates that the TB corresponding to the current decoding unit includes a non-zero transform coefficient, that is, the TB corresponding to the current decoding unit includes one or more non-zero transform coefficients; and the first identification information being equal to 0 indicates that the TB corresponding to the current decoding unit does not include any non-zero transform coefficient, that is, all element values in the TB corresponding to the current decoding unit are 0.

Because the current decoding unit includes one or more decoding blocks, each decoding block corresponds to one TB. Assuming that the current decoding unit includes n decoding blocks, the n decoding blocks correspond to n TBs in a one-to-one correspondence, n being a positive integer. Therefore, if the first identification information indicates that the TB corresponding to the current decoding unit includes a non-zero transform coefficient, it indicates that at least one of the foregoing n TBs includes a non-zero transform coefficient; and if the first identification information indicates that the TB corresponding to the current decoding unit does not include any non-zero transform coefficient, it indicates that none of the foregoing n TBs include any non-zero transform coefficient.

In addition, the first identification information may be present in the CU syntax structure, or may be present in the TU syntax structure. This is not limited in this embodiment of this disclosure.

In an example, the first identification information is present in the CU syntax structure. The first identification information can be cu_cbf, a value of cu_cbf being equal to 1 indicating that the TB corresponding to the current decoding unit includes a non-zero transform coefficient; and the value of cu_cbf being equal to 0 indicating that the TB corresponding to the current decoding unit does not include any non-zero transform coefficient.

In one embodiment, when the coding tree type corresponding to the current decoding unit is DUAL_TREE_LUMA, the value of cu_cbf being equal to 1 indicates that the luma TB corresponding to the current decoding unit includes a non-zero transform coefficient; and the value of cu_cbf being equal to 0 indicates that the luma TB corresponding to the current decoding unit does not include any non-zero transform coefficient.

In one embodiment, when the coding tree type corresponding to the current decoding unit is DUAL_TREE_CHROMA, the value of cu_cbf being equal to 1 indicates that at least one of a first chroma TB and a second chroma TB that correspond to the current decoding unit includes a non-zero transform coefficient; and the value of cu_cbf being equal to 0 indicates that neither of the first chroma TB and the second chroma TB that correspond to the current decoding unit includes any non-zero transform coefficient.

In one embodiment, when the coding tree type corresponding to the current decoding unit is SINGLE_TREE, the value of cu_cbf being equal to 1 indicates that at least one of the luma TB, the first chroma TB, and the second chroma TB that correspond to the current decoding unit includes a non-zero transform coefficient; and the value of cu_cbf being equal to 0 indicates that none of the luma TB, the first chroma TB, and the second chroma TB that correspond to the current decoding unit includes any non-zero transform coefficient.

In another example, the first identification information is present in the TU syntax structure. The first identification information can be tu_cbf_chroma[xC][yC], a value of tu_cbf_chroma[xC][yC] being equal to 1 indicating that at least one of a first chroma TB and a second chroma TB that correspond to the current decoding unit includes a non-zero transform coefficient; and the value of tu_cbf_chroma[xC][yC] being equal to 0 indicating that neither of the first chroma TB and the second chroma TB that correspond to the current decoding unit includes a non-zero transform coefficient. Because there are two types of image chroma, namely, Cb and Cr, the foregoing first chroma TB is a Cb TB, and the second chroma TB is a Cr TB; or the first chroma TB is a Cr TB, and the second chroma TB is a Cb TB.

In Step 1003, when the first identification information indicates that the TB corresponding to the current decoding unit does not include any non-zero transform coefficient, determine that a residual block corresponding to the current decoding unit is an all-zero residual block.

If the TB corresponding to the current decoding unit does not include any non-zero transform coefficient, that is, all the element values in the TB corresponding to the current decoding unit are 0, the decoder-side device may determine that a residual block corresponding to the current decoding unit is an all-zero residual block, that is, all element values in the residual block are 0. In this case, the decoder side device may transmit the residual block without transmitting a transform tree syntax structure (that is, transform_tree( )). Correspondingly, the decoder-side device may also obtain the residual block without decoding the transform tree syntax structure, thereby improving the encoding and decoding efficiency.

In addition, if the first identification information indicates that the TB corresponding to the current decoding unit includes a non-zero transform coefficient, the decoder-side device may further decode the transform tree syntax structure, and determine all the element values in the residual block corresponding to the current decoding unit.

In Step 1004, the current decoding unit is reconstructed according to the residual block and a prediction block corresponding to the current decoding unit.

After obtaining the residual block corresponding to the current decoding unit through decoding, the decoder side device may reconstruct the current decoding unit with reference to the prediction block corresponding to the current decoding unit. The reconstructed current decoding unit may also be referred to as a reconstruction unit. For each decoding block included in the current decoding unit, the decoder-side device can reconstruct the decoding block according to a residual block and a prediction block that correspond to the decoding block. The reconstructed decoding block may also be referred to as a reconstruction block.

In summary, in the technical solutions provided in the embodiments of this disclosure, a decoding unit using a BDPCM mode decodes first identification information corresponding to the decoding unit, to learn whether a TB corresponding to the decoding unit includes a non-zero transform coefficient. If the first identification information indicates that the TB corresponding to the decoding unit does not include any non-zero transform coefficient, a decoder-side device does not need to decode a transform tree syntax structure corresponding to the decoding unit to decode and obtain a residual block, and may directly determine that the residual block corresponding to the decoding unit is an all-zero residual block, thereby improving the encoding and decoding efficiency of the decoding unit using the BDPCM mode.

In an exemplary embodiment, before decoding the first identification information corresponding to the current decoding unit, the decoder-side device first determines whether the current decoding unit meets a predefined condition. The decoder-side device then performs, when the current decoding unit meets the predefined condition, the step of decoding first identification information corresponding to the current decoding unit. The predefined condition includes determining, according to a coding tree type corresponding to the current decoding unit, that all the color components of the current decoding unit use the BDPCM mode.

There may be three coding tree types (treeType) as follows: DUAL_TREE_LUMA, DUAL_TREE_CHROMA, and SINGLE_TREE. DUAL_TREE_LUMA represents separately encoding luma and chroma, and corresponds to a luma coding tree; DUAL_TREE_CHROMA represents separately encoding luma and chroma, and corresponds to a chroma coding tree; and SINGLE_TREE represents encoding luma and chroma together. When treeType is equal to SINGLE_TREE, the CU syntax structure includes syntax of a luma coding block and two chroma coding blocks. When treeType is equal to DUAL_TREE_LUMA, the CU syntax structure includes only syntax of a luma coding block. When treeType is equal to DUAL_TREE_CHROMA, the CU syntax structure includes only syntax of two chroma coding blocks.

In one embodiment, when the coding tree type corresponding to the current decoding unit is DUAL_TREE_LUMA, because a coding tree corresponding to DUAL_TREE_LUMA is a luma coding tree in a dual tree, and in this case, the current decoding unit includes only one luma decoding block, the step of decoding first identification information corresponding to the current decoding unit is performed when it is determined that a luma component of the current decoding unit (that is, the luma decoding block) uses the BDPCM mode.

In one embodiment, when the coding tree type corresponding to the current decoding unit is DUAL_TREE_CHROMA, because a coding tree corresponding to DUAL_TREE_CHROMA is a chroma coding tree in a dual tree, and in this case, the current decoding unit includes only two chroma decoding blocks, the step of decoding first identification information corresponding to the current decoding unit is performed when it is determined that two chroma components of the current decoding unit (that is, the two chroma decoding blocks) both use the BDPCM mode.

In one embodiment, when the coding tree type corresponding to the current decoding unit is SINGLE_TREE, because a coding tree corresponding to SINGLE_TREE is a single tree, and in this case, the current decoding unit includes one luma decoding block and two chroma decoding blocks, the step of decoding first identification information corresponding to the current decoding block is performed when it is determined that one luma component and two chroma components of the current decoding unit (that is, one luma decoding block and two chroma decoding blocks) all use the BDPCM mode.

In this embodiment, the foregoing predefined condition is added to the CU or TU syntax structure, so that when determining that the BDPCM mode is applied to the current decoding unit, and decoding blocks of all color components included in the current decoding unit all use the BDPCM mode, the decoder side device decodes the first identification information corresponding to the current decoding unit, thereby improving the accuracy of decoding the first identification information.

The technical solutions provided in this disclosure are described below by using several exemplary embodiments.

In an example, the first identification information is present in the CU syntax structure, and in the CU syntax structure, one coding block flag (that is, the first identification information described above) is transmitted for a BDPCM luma coding block. If the flag indicates that the BDPCM luma coding block does not have any non-zero transform coefficient, the syntax structure transform_tree( ) is absent from the bitstream. Exemplarily, the CU syntax structure may be shown in Table 6 below:

As shown in Table 6, the predefined condition, can include a value of BdpcmFlag[x0][y0][0] is 1, and at least one of the following conditions 1 and 2 are met.

Condition 1: A value of treeType is DUAL_TREE_LUMA.

Condition 2: A value of treeType is SINGLE_TREE, and a value of ChromaArrayType is not equal to 3.

That is, when the value of BdpcmFlag[x0][y0][0] is 1, and at least one of the foregoing condition 1 and condition 2 is met, the decoder-side device needs to decode the syntax element cu_cbf. If the value of cu_cbf is equal to 1, the decoder-side device determines that the TB corresponding to the current decoding unit includes a non-zero transform coefficient; and if the value of cu_cbf is equal to 0, the decoder-side device determines that the TB corresponding to the current decoding unit does not include any non-zero transform coefficient. If the value of cu_cbf is equal to 1, the decoder-side device further decodes the transform_tree( )

TABLE 6

| coding_unit( x0, y0, cbWidth, cbHeight, cqtDepth, treeType, modeType ) { | Descriptor |
|---|---|
| ... | |
|     if( sps_bdpcm_enabled_flag && | |
|         cbWidth <= MaxTsSize && cbHeight <= MaxTsSize) | |
|         intra_bdpcm_luma_flag | ae(v) |
|     if( intra_bdpcm_luma_flag ) | |
|         intra_bdpcm_luma_dir_flag | ae(v) |
|     if( !cu_act_enabled_flag ) { | |
|       if( cbWidth <= MaxTsSize && cbHeight <= MaxTsSize && | |
|         sps_bdpcm_chroma_enabled_flag ) { | |
|         intra_bdpcm_chroma_flag | ae(v) |
|         if( intra_bdpcm_chroma_flag ) | |
|           intra_bdpcm_chroma_dir_flag | ae(v) |
|       } | |
|     } | |
| ... | |
|   if( (CuPredMode[ chType ][ x0 ][ y0 ] != MODE_INTRA && !pred_mode_plt_flag && | |
|     general_merge_flag[ x0 ][ y0 ] = = 0) \|\| (BdpcmFlag [x0][y0][0]&& (treeType== DUAL_TREE_LUMA \|\| (treeType== SINGLE_TREE&& ChromaArrayType !=3))) | |
|     cu_cbf | ae(v) |
| if(cu_cbf){ | |
| ... | |
|     transform_tree( x0, y0, cbWidth, cbHeight, treeType, chType ) | |
| ... | |
| } | |
| } | |

Syntax elements and corresponding semantic meanings appearing in Table 6 are the same as those described in the foregoing part 2.2, and details are not described herein again. In this example, the predefined condition includes the BDPCM mode is applied to a luma component of the current decoding unit, and at least one of the following conditions 1 and 2 are met.

Condition 1: The coding tree type corresponding to the current decoding unit is DUAL_TREE_LUM.

Condition 2: The coding tree type corresponding to the current decoding unit is SINGLE_TREE, and a value of ChromaArrayType is not equal to 3, the value of ChromaArrayType being equal to 3 indicating that 3 color components of the current decoding unit are not separately decoded, and a chroma format is 4:4:4.

syntax structure, to obtain a residual block corresponding to the current decoding unit; and if the value of cu_cbf is equal to 0, the decoder-side device does not need to decode the transform_tree( ) syntax structure, and directly determines that the residual blocks corresponding to the current decoding unit are all-zero residual blocks.

In another example, the first identification information is present in the CU syntax structure, and in the CU syntax structure, one coding block flag (that is, the first identification information described above) is transmitted for the BDPCM chroma coding blocks in DUAL_TREE_CHROMA. If the flag indicates that the BDPCM chroma coding block does not have any non-zero transform coefficient, the syntax structure transform_tree( ) is absent from the bitstream. Exemplarily, the CU syntax structure may be shown in Table 7 below:

TABLE 7

| coding_unit( x0, y0, cbWidth, cbHeight, cqtDepth, treeType, modeType ) { | Descriptor |
|---|---|
| ... | |
|     if( sps_bdpcm_enabled_flag &&  | |
|         cbWidth <= MaxTsSize && cbHeight <= MaxTsSize ) | |
|         intra_bdpcm_luma_flag | ae(v) |
|     if( intra_bdpcm_luma_flag ) | |
|         intra_bdpcm_luma_dir_flag | ae(v) |
|     if( !cu_act_enabled_flag ) { | |
|       if( cbWidth <= MaxTsSize && cbHeight <= MaxTsSize && | |
|         sps_bdpcm_chroma_enabled_flag ) { | |
|         intra_bdpcm_chroma_flag | ae(v) |
|         if( intra_bdpcm_chroma_flag ) | |
|           intra_bdpcm_chroma_dir_flag | ae(v) |
|       } | |
|     } | |
| ... | |
|   if( (CuPredMode[ chType ][ x0 ][ y0 ] != MODE_INTRA && !pred_mode_plt_flag && | |
|   general_merge_flag[ x0 ][ y0 ] = = 0) \|\| (BdpcmFlag [x0][y0][1] && treeType== DUAL_TREE_CHROMA)) | |
|     cu_cbf | ae(v) |
| ... | |
|   transform_tree( x0, y0, cbWidth, cbHeight, treeType, chType ) | |
| ... | |
| } | |
| } | |

Syntax elements and corresponding semantic meanings appearing in Table 7 are the same as those described in the foregoing part 2.2, and details are not described herein again. In this example, the predefined condition includes: the BDPCM mode is applied to chroma components of the current decoding unit, and the coding tree type corresponding to the current decoding unit is DUAL_TREE_CHROMA.

As shown in Table 7, the predefined condition can include: a value of BdpcmFlag[x0][y0][1] is 1, and a value of treeType is DUAL_TREE_CHROMA.

That is, when the value of BdpcmFlag[x0][y0][1] is 1, and the treeType is equal to DUAL_TREE_CHROMA, the decoder-side device needs to decode the syntax element cu_cbf. If the value of cu_cbf is equal to 1, the decoder-side device determines that at least one of the first chroma TB and the second chroma TB that correspond to the current decoding unit includes a non-zero transform coefficient; and if the value of cu_cbf is equal to 0, the decoder-side device determines that neither of the first chroma TB and the second chroma TB that correspond to the current decoding unit includes any non-zero transform coefficient. If the value of cu_cbf is equal to 1, the decoder-side device further decodes the transform_tree( ) syntax structure, to obtain a residual block corresponding to the current decoding unit; and if the value of cu_cbf is equal to 0, the decoder-side device does not need to decode the transform_tree( ) syntax structure, and directly determines that the residual blocks corresponding to the current decoding unit (including a residual block corresponding to the first chroma TB and a residual block corresponding to the second chroma TB) are all-zero residual blocks.

Exemplarily, the TU syntax structure may be shown in Table 8 below:

TABLE 8

| transform_unit( x0, y0, tbWidth, tbHeight, treeType, subTuIndex, chType ) { | Descriptor |
|---|---|
| ... | |
|   if( ( treeType = = SINGLE_TREE \|\| treeType = = DUAL_TREE_CHROMA ) && | |
|       ChromaArrayType != 0 ) { | |
|     if( ( IntraSubPartitionsSplitType = = ISP_NO_SPLIT && !( cu_sbt_flag && | |
|       ( ( subTuIndex = = 0 && cu_sbt_pos_flag ) \|\| | |
|       ( subTuIndex = = 1 && !cu_sbt_pos_flag ) ) ) ) \|\| | |
|      ( IntraSubPartitionsSplitType != ISP_NO_SPLIT && ( subTuIndex = = NumIntraSubPartitions − 1 ) ) ) { | |
|       tu_cbf_cb[ xC ][ yC ] | ae(v) |
|       if ( !(treeType ==DUAL_TREE CHROMA)\|\| !BdpcmFlag[x0][y0][1] \|\|tu_cbf_cb[ xC ][ yC ]) ) | |
|         tu_cbf_cr[ xC ][ yC ] | ae(v) |
|     } | |
|   } | |
| ... | |
| } | |

With reference to the syntax structures shown in Table 7 and Table 8, second identification information corresponding to the current decoding unit is decoded when the first identification information indicates that the TB corresponding to the current decoding unit includes a non-zero transform coefficient (that is, the value of cu_cbf is equal to 1), the second identification information being used for indicating whether a first chroma TB corresponding to the current decoding unit includes a non-zero transform coefficient. In one embodiment, the second identification information being equal to 1 indicates that the first chroma TB corresponding to the current decoding unit includes a non-zero transform coefficient, that is, the first chroma TB corresponding to the current decoding unit includes one or more non-zero transform coefficients; and the second identification information being equal to 0 indicates that the first chroma TB corresponding to the current decoding unit does not include any non-zero transform coefficient, that is, all element values in the first chroma TB corresponding to the current decoding unit are 0.

As shown in Table 8, the second identification information can be tu_cbf_cb[xC][yC]. A value of tu_cbf_cb[xC][yC] being equal to 1 indicates that the Cb TB corresponding to the current decoding unit includes a non-zero transform coefficient. The value of tu_cbf_cb[xC][yC] being equal to 0 indicates that the Cb TB corresponding to the current decoding unit does not include any non-zero transform coefficient.

After the second identification information is decoded, third identification information corresponding to the current decoding unit is further decoded when at least one condition in a first condition set is met, the third identification information being used for indicating whether a second chroma TB corresponding to the current decoding unit includes a non-zero transform coefficient. The first condition set may include the following conditions.

Condition 1: The BDPCM mode is not applied to the chroma components of the current decoding unit.
Condition 2: The coding tree type corresponding to the current decoding unit is not DUAL_TREE_CHROMA.
Condition 3: A value of the second identification information indicates that the first chroma TB corresponding to the current decoding unit does not include any non-zero transform coefficient.

In one embodiment, the third identification information being equal to 1 indicates that the second chroma TB corresponding to the current decoding unit includes a non-zero transform coefficient, that is, the second chroma TB corresponding to the current decoding unit includes one or more non-zero transform coefficients; and the third identification information being equal to 0 indicates that the second chroma TB corresponding to the current decoding unit does not include any non-zero transform coefficient, that is, all the element values in the second chroma TB corresponding to the current decoding unit are 0.

As shown in Table 8, the third identification information can be tu_cbf_cr[xC][yC]. A value of tu_cbf_cr[xC][yC] being equal to 1 indicates that the Cr TB corresponding to the current decoding unit includes a non-zero transform coefficient. The value of tu_cbf_cr[xC][yC] being equal to 0 indicates that the Cr TB corresponding to the current decoding unit does not include any non-zero transform coefficient.

As shown in Table 8, the first condition set may include the following conditions.

Condition 1. The value of BdpcmFlag[x0][y0][1] is not equal to 1.
Condition 2: The value of treeType is not equal to DUAL_TREE_CHROMA.
Condition 3: A value of the second identification information (that is, tu_cbf_cb[xC][yC] in Table 8) is equal to 0.

In addition, when tu_cbf_cr[xC][yC] is absent, a process of inferring the value of tu_cbf_cr[xC][yC] may be as follows.

If the value of BdpcmFlag[x0][y0][1] is equal to 1 and all the following conditions are met, the value of tu_cbf_cr[xC][yC] is inferred to be equal to 1.

The value of treeType is equal to DUAL_TREE_CHROMA.
The value of tu_cbf_cb[xC][yC] is equal to 0.
Otherwise, the value of tu_cbf_cr[xC][yC] is inferred to be equal to 0.

In another example, the first identification information is present in the CU syntax structure, and in the CU syntax structure, one coding block flag (that is, the first identification information described above) is transmitted for the BDPCM luma and chroma coding blocks in SINGLE_TREE. If the flag indicates that none of the BDPCM luma and chroma coding blocks has any non-zero transform coefficient, the syntax structure transform_tree( ) is absent from the bitstream. Exemplarily, the CU syntax structure may be shown in Table 9 below:

TABLE 9

| coding_unit( x0, y0, cbWidth, cbHeight, cqtDepth, treeType, modeType ) { | Descriptor |
|---|---|
| ... | |
|     if( sps_bdpcm_enabled_flag && | |
|       cbWidth <= MaxTsSize && cbHeight <= MaxTsSize) | |
|       intra_bdpcm_luma_flag | ae(v) |
|     if( intra_bdpcm_luma_flag ) | |
|       intra_bdpcm_luma_dir_flag | ae(v) |
|     if( !cu_act_enabled_flag ) { | |
|       if( cbWidth <= MaxTsSize && cbHeight <= MaxTsSize && | |
|         sps_bdpcm_chroma_enabled_flag ) { | |
|         intra_bdpcm_chroma_flag | ae(v) |
|         if( intra_bdpcm_chroma_flag ) | |
|           intra_bdpcm_chroma_dir_flag | ae(v) |
|       } | |
|     } | |
| ... | |

TABLE 9-continued

| coding_unit( x0, y0, cbWidth, cbHeight, cqtDepth, treeType, modeType ) { | Descriptor |
|---|---|
|     if( (CuPredMode[ chType ][ x0 ][ y0 ] != MODE_INTRA && !pred_mode_plt_flag && | |
|         general_merge_flag[ x0 ][ y0 ] = = 0) \|\| (BdpcmAllFlag [x0][y0]&& treeType== SINGLE_TREE)) | |
|         cu_cbf | ae(v) |
|   if(cu_cbf){ | |
| . . . | |
|     transform_tree( x0, y0, cbWidth, cbHeight, treeType, chType ) | |
| . . . | |
| } | |
| } | |

Syntax elements and corresponding semantic meanings appearing in Table 9 are the same as those described in the foregoing part 2.2, and details are not described herein again. In this example, the predefined condition includes: the BDPCM mode is applied to all the color components of the current decoding unit, and the coding tree type corresponding to the current decoding unit is SINGLE_TREE.

As shown in Table 9, the predefined condition can include: a value of BdpcmAllFlag[x0][y0] is 1, and the value of treeType is SINGLE_TREE.

A process of deriving the variable BdpcmAllFlag[x0][y0] is as follows.

If BdpcmFlag[x0][y0][cIdx] is equal to 1 when cIdx is 0, 1, or 2, the value of BdpcmAllFlag [x0][y0] is set to 1.

Otherwise, the value of BdpcmAllFlag[x0][y0] is set to 0.

That is, when the value of BdpcmAllFlag[x0][y0] is 1, and treeType is equal to SINGLE_TREE, the decoder-side device needs to decode the syntax element cu_cbf. If the value of cu_cbf is equal to 1, the decoder-side device determines that at least one of one luma TB and two chroma TBs that correspond to the current decoding unit includes a non-zero transform coefficient; and if the value of cu_cbf is equal to 0, the decoder-side device determines that none of the one luma TB and the two chroma TBs that correspond to the current decoding unit includes any non-zero transform coefficient. If the value of cu_cbf is equal to 1, the decoder-side device further decodes the transform_tree( ) syntax structure, to obtain a residual block corresponding to the current decoding unit; and if the value of cu_cbf is equal to 0, the decoder side device does not need to decode the transform_tree( ) syntax structure, and directly determines that the residual blocks corresponding to the current decoding unit (including residual blocks respectively corresponding to one luma TB and two chroma TBs) are all-zero residual blocks.

In another example, the first identification information is present in the TU syntax structure, and in the TU syntax structure, one coding block flag (that is, the first identification information described above) is transmitted for the BDPCM chroma coding blocks in SINGLE_TREE. Exemplarily, the TU syntax structure may be shown in Table 10 below:

TABLE 10

| transform_unit( x0, y0, tbWidth, tbHeight, treeType, subTuIndex, chType ) { | Descriptor |
|---|---|
| . . . | |
|   if(BdpcmAllFlag [x0] [y0]&& treeType== SINGLE_TREE) | |
|     tu_cbf_chroma[xC][yC] | ae(v) |
|   if( ( treeType = = SINGLE_TREE \|\| treeType = = DUAL_TREE_CHROMA ) && | |
|         ChromaArrayType != 0) { | |
|     if( ( IntraSubPartitionsSplitType = = ISP_NO_SPLIT && !( cu_sbt_flag && | |
|         ( ( subTuIndex = = 0 && cu_sbt_pos_flag ) \|\| | |
|           ( subTuIndex = = 1 && !cu_sbt_pos_flag ) ) ) ) \|\| | |
|       ( IntraSubPartitionsSplitType != ISP_NO_SPLIT && | |
|         ( subTuIndex = = NumIntraSubPartitions − 1 ) ) ) { | |
|       if (tu_cbf chroma[xC][yC]) { | |
|         tu_cbf_cb[ xC ][ yC ] | ae(v) |
|         if( tu_cbf cb[ xC ][ yC ] \|\| !BdpcmAllFlag [x0][y0]\|\| !treeType== SINGLE_TREE) | |
|           tu_cbf_cr[ xC ][ yC ] | ae(v) |
|       } | |
|     } | |
|   } | |
|   if( treeType = = SINGLE_TREE \|\| treeType = = DUAL_TREE_LUMA ) { | |
|     if( ( IntraSubPartitionsSplitType = = ISP_NO_SPLIT && !( cu_sbt_flag && | |
|         ( ( subTuIndex = = 0 && cu_sbt_pos_flag ) \|\| | |
|           ( subTuIndex = = 1 && !cu_sbt_pos_flag ) ) ) && | |
|         ( CuPredMode[ chType ][ x0 ][ y0 ] = = MODE_INTRA \|\| | |
|         ( chromaAvailable && ( tu_cbf_cb[ xC ][ yC ] \|\| | |
|   tu_cbf_cr[ xC ][ yC ] ) ) \|\| | |

TABLE 10-continued

| transform_unit( x0, y0, tbWidth, tbHeight, treeType, subTuIndex, chType ) { | Descriptor |
|---|---|
|         CbWidth[ chType ][ x0 ][ y0 ] > MaxTbSizeY ||<br>        CbHeight[ chType ][ x0 ][ y0 ] > MaxTbSizeY ) ) ||<br>    ( IntraSubPartitionsSplitType != ISP_NO_SPLIT &&<br>    ( subTuIndex < NumIntraSubPartitions − 1 || !InferTuCbfLuma ) ) )<br>    tu_cbf_luma[ x0 ][ y0 ]<br>}<br>...<br>} | ae(v) |

In this example, the predefined condition includes: the BDPCM mode is applied to all the color components of the current decoding unit, and the coding tree type corresponding to the current decoding unit is SINGLE_TREE.

As shown in Table 10, the predefined condition can include: a value of BdpcmAllFlag[x0][y0] is 1, and the value of treeType is SINGLE_TREE.

That is, when the value of BdpcmAllFlag[x0][y0] is 1, and treeType is equal to SINGLE_TREE, the decoder-side device needs to decode the syntax element tu_cbf_chroma [xC][yC]. If the value of tu_cbf_chroma[xC][yC] is equal to 1, the decoder-side device determines that at least one of the first chroma TB and the second chroma TB that correspond to the current decoding unit includes a non-zero transform coefficient. If the value of tu_cbf_chroma[xC][yC] is equal to 0, the decoder-side device determines that neither of the first chroma TB and the second chroma TB that correspond to the current decoding unit includes any non-zero transform coefficient. If the value of tu_cbf_chroma[xC][yC] is equal to 1, the decoder side device further decodes subsequent syntax elements in the TU syntax structure, to obtain residual blocks corresponding to the current decoding unit; and if the value of tu_cbf_chroma[xC][yC] is equal to 0, the decoder-side device does not need to decode the subsequent syntax elements in the TU syntax structure, and directly determines that the residual blocks corresponding to the current decoding unit (including the residual block corresponding to the first chroma TB and the residual block corresponding to the second chroma TB) are all-zero residual blocks.

With reference to the syntax structure shown in Table 10, second identification information corresponding to the current decoding unit is decoded when the first identification information indicates that at least one of the first chroma TB and the second chroma TB that correspond to the current decoding unit includes a non-zero transform coefficient (that is, the value of to cbf chroma[xC][yC] is equal to 1), the second identification information being used for indicating whether the first chroma TB corresponding to the current decoding unit includes a non-zero transform coefficient. In one embodiment, the second identification information being equal to 1 indicates that the first chroma TB corresponding to the current decoding unit includes a non-zero transform coefficient, that is, the first chroma TB corresponding to the current decoding unit includes one or more non-zero transform coefficients; and the second identification information being equal to 0 indicates that the first chroma TB corresponding to the current decoding unit does not include any non-zero transform coefficient, that is, all element values in the first chroma TB corresponding to the current decoding unit are 0.

In one embodiment, as shown in Table 10, the second identification information is tu_cbf_cb[xC][yC]. A value of tu_cbf_cr[xC][yC] being equal to 1 indicates that the Cr TB corresponding to the current decoding unit includes a non-zero transform coefficient. The value of tu_cbf_cr[xC][yC] being equal to 0 indicates that the Cr TB corresponding to the current decoding unit does not include any non-zero transform coefficient.

After the second identification information is decoded, third identification information corresponding to the current decoding unit is further decoded when at least one condition in a second condition set is met, the third identification information being used for indicating whether the second chroma TB corresponding to the current decoding unit includes a non-zero transform coefficient. In one embodiment, the second condition set includes the following conditions.

Condition 1: The coding tree type corresponding to the current decoding unit is not SINGLE_TREE.
    Condition 2: A value of the second identification information indicates that the first chroma TB corresponding to the current decoding unit includes a non-zero transform coefficient.
    Condition 3: The BDPCM mode is not applied to all the color components of the current decoding unit.

In one embodiment, the third identification information being equal to 1 indicates that the second chroma TB corresponding to the current decoding unit includes a non-zero transform coefficient, that is, the second chroma TB corresponding to the current decoding unit includes one or more non-zero transform coefficients; and the third identification information being equal to 0 indicates that the second chroma TB corresponding to the current decoding unit does not include any non-zero transform coefficient, that is, all the element values in the second chroma TB corresponding to the current decoding unit are 0.

In one embodiment, as shown in Table 10, the second identification information is tu_cbf_cb[xC][yC]. A value of tu_cbf_cb[xC][yC] being equal to 1 indicates that the Cb TB corresponding to the current decoding unit includes a non-zero transform coefficient. The value of tu_cbf_cb[xC][yC] being equal to 0 indicates that the Cb TB corresponding to the current decoding unit does not include any non-zero transform coefficient. The value of tu_cbf_cr[xC][yC] being equal to 0 indicates that the Cr TB corresponding to the current decoding unit does not include any non-zero transform coefficient.

As shown in Table 10, the second condition set includes the following conditions.
    Condition 1: The value of treeType is not equal to SINGLE_TREE.
    Condition 2: A value of the second identification information (that is, tu_cbf_cb[xC][yC] in Table 10) is equal to 1.
    Condition 3: The value of BdpcmAllFlag[x0][y0] is not equal to 1.

In addition, when tu_cbf_cr[xC][yC] is absent, a process of inferring the value of tu_cbf_cr[xC][yC] may be as follows.

If all the following conditions are met, the value of tu_cbf_cr[xC][yC] is inferred to be equal to 1.
  A value of tu_cbf_chroma[x0][y0] is equal to 1.
  The value of tu_cbf_cb[xC][yC] is equal to 0.
  The value of BdpcmAllFlag [x0][y0] is equal to 1.
  The value of treeType is equal to SINGLE_TREE.

Otherwise, the value of tu_cbf_cr[xC][yC] is inferred to be equal to 0.

In addition, for the syntax element tu_cbf_chroma[xC][yC], the encoder side device may encode the syntax element tu_cbf_chroma[xC][yC] by using an entropy coding scheme of context-based adaptive binary arithmetic coding (CABAC); and correspondingly, the decoder-side device may also decode the syntax element tu_cbf_chroma[xC][yC] by using an entropy decoding scheme of CABAC.

The syntax element tu_cbf_chroma[xC][yC] may be binarized by using a fixed-length binarization method with cMax (a maximum upper limit) being 1. The following is a process of initializing context ctxIdx of the syntax element, and the process is guided by a variable initValue. A specific process of deriving a variable initType is shown in the following pseudo code:

```
if( slice_type = = I )
    initType = 0
else if( slice_type = = P )
    initType = cabac_init_flag ? 2 : 1
else
    initType = cabac_init_flag ? 1 : 2
```

A value of initValue of a syntax element tu_cbf_chroma is obtained from the value of initType according to Table 11. With reference to Table 11 and Table 12, initValue and shiftIdx of the syntax element tu_cbf_chroma may be derived.

The following is a process of determining initial probability states pStateIdx0 and pStateIdx1 according to the value of initValue.

First, values of variables slopeIdx and offsetIdx are determined according to the value of the variable initValue, as shown in the following formulas.

$$slopeIdx = initValue >> 3 \quad \text{Formula 17}$$

$$offsetIdx = initValue \ \& \ 7 \quad \text{Formula 18}$$

Then, the initial probability states pStateIdx0 and pStateIdx1 are determined according to the values of slopeIdx and offsetIdx, and details are shown in the following formulas.

$$m = slopeIdx - 4 \quad \text{Formula 19}$$

$$n = (offsetIdx * 18) + 1 \quad \text{Formula 20}$$

$$preCtxState = Clip3(1, 127, ((m*(Clip3(0, 51, SliceQpY) - 16)) >> 1) + n) \quad \text{Formula 21}$$

SliceQpY is a QP value of a Y component of a current coding slice.

$$pStateIdx0 = preCtxState << 3 \quad \text{Formula 22}$$

$$pStateIdx1 = preCtxState << 7 \quad \text{Formula 23}$$

The variable shiftIdx is used for updating a probability state of entropy coding, and a specific process is as follows.

An input is probability states pStateIdx0 and pStateIdx1 of a current symbol, and a current decoded symbol value binVal.

An output is updated probability states pStateIdx0 and pStateIdx1.

A specific derivation process is as follows.

First, values of variables shift0 and shift1 are calculated according to a value of shiftIdx, as shown in the following formulas:

$$shift0 = (shiftIdx >> 2) + 2 \quad \text{Formula 24}$$

$$shift1 = (shiftIdx \ \& \ 3) + 3 + shift0 \quad \text{Formula 25}$$

Then, the updated probability states are determined according to the values of shift0 and shift1, as shown in the following formulas:

$$pStateIdx0 = pStateIdx0 - (pStateIdx0 >> shift0) + (1023 * binVal >> shift0) \quad \text{Formula 26}$$

$$pStateIdx1 = pStateIdx1 - (pStateIdx1 >> shift1) + (16383 * binVal >> shift1) \quad \text{Formula 27}$$

TABLE 11

| Syntax structure | Syntax element | initType 0 | 1 | 2 |
|---|---|---|---|---|
| transform unit( ) | tu_cbf_chroma | 0 | 1 | 2 |

TABLE 12

| Initialized variable | ctxIdx of tu_cbf_chroma 0 | 1 | 2 |
|---|---|---|---|
| initValue | EP | EP | EP |
| shiftIdx | 0 | 0 | 0 |

A process of deriving ctxTable and ctxIdx of the syntax element tu_cbf_chroma is as follows.

An input is an index of a current coded bit, namely, binIdx.

An output is ctxTable and ctxIdx used for context adaptive arithmetic entropy coding of the bit.

Values of ctxTable and ctxIdx of each binIdx are derived from the following Table 13, and details are as follows.

If a corresponding value of the current binIdx is not equal to "na" in Table 13, binIdx needs to be encoded and decoded by using an algorithm. ctxTable is specified in Table 11; ctxInc is specified in Table 13; ctxIdxOffset is specified by initType according to Table 11; ctxIdx is equal to a sum of ctxInc and ctxIdxOffset; and bypassFlag is set to 0.

Otherwise (the corresponding value of the current binIdx is equal to "na" in Table 13), the value corresponding to binIdx is absent from the current syntax element.

TABLE 13

| Syntax element | binIdx 0 | 1 | 2 | 3 | 4 | >=5 |
|---|---|---|---|---|---|---|
| tu_cbf_chroma | 0 | na | na | na | na | na |

In several exemplary embodiments described above, one coding block flag (that is, the first identification information described above) is transmitted for the BDPCM CU in the CU or TU syntax structure, to indicate whether the BDPCM CU includes a non-zero transform coefficient. Therefore, when there is no non-zero transform coefficient, it may be directly determined that the residual blocks corresponding to the BDPCM CU are all-zero residual blocks, thereby improving the encoding and decoding efficiency of the CU using the BDPCM mode.

Figure 11:
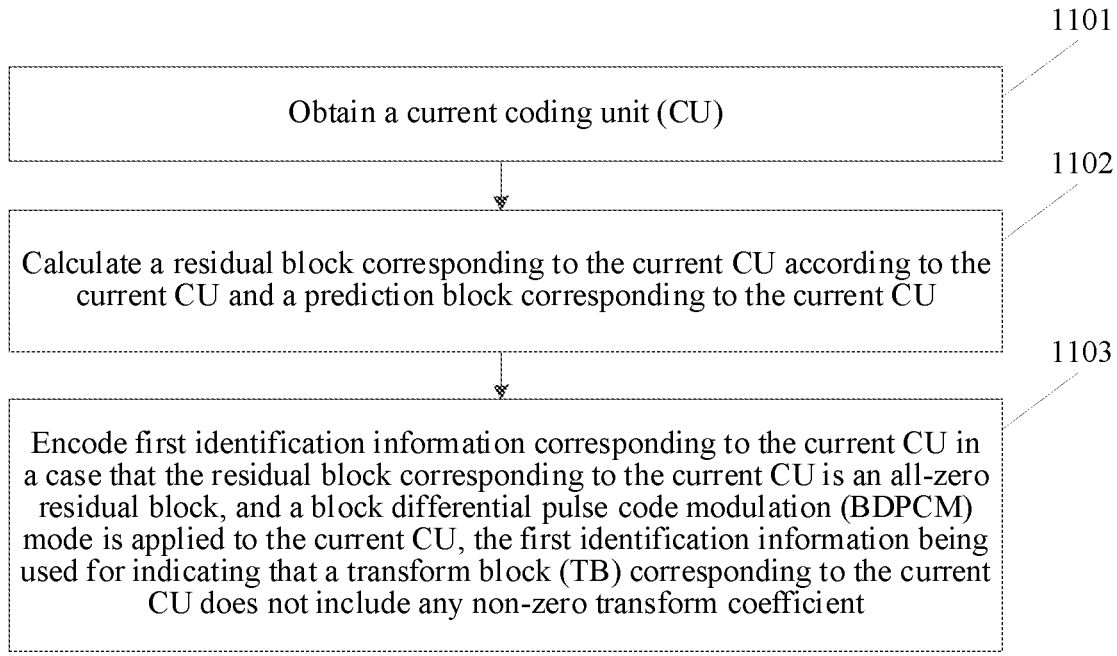
FIG. 11 is a flowchart of a video encoding method according to an embodiment of this disclosure.

FIG. 11 is a flowchart of a video encoding method according to an embodiment of this disclosure. In this embodiment, descriptions are made mainly by using an example in which the method is applicable to the encoder side device described above. The method may include the following steps (1101 to 1103):

In Step 1101, a current CU is obtained.

In Step 1102, a residual block corresponding to the current CU is calculated according to the current CU and a prediction block corresponding to the current CU.

The current CU may include coding blocks corresponding to one or more color components. The encoder side device may calculate, by using prediction modes such as an intra-frame prediction mode and an inter-frame prediction mode, prediction blocks corresponding to the coding blocks included in the current CU, and then further calculate residual blocks corresponding to the coding blocks.

In Step 1103, first identification information corresponding to the current CU is encoded when the residual block corresponding to the current CU is an all-zero residual block, and a BDPCM mode is applied to the current CU, the first identification information being used for indicating that a TB corresponding to the current CU does not include any non-zero transform coefficient.

The encoder-side device may determine that the first identification information corresponding to the current CU is equal to 0 when the residual block corresponding to the current CU is an all-zero residual block, and the BDPCM mode is applied to the current CU; and the encoder-side device may determine that the first identification information corresponding to the current CU is equal to 1 when the residual block corresponding to the current CU is not an all-zero residual block. When the first identification information is equal to 0, the encoder-side device may transmit the residual block without transmitting a transform tree syntax structure; and when the first identification information is equal to 1, the encoder-side device may transmit the residual block by transmitting the transform tree syntax structure.

In one embodiment, first identification information corresponding to the current CU is encoded when the residual block corresponding to the current CU is an all-zero residual block, and all color components of the current CU use a BDPCM mode, the first identification information being used for indicating that a TB corresponding to the current CU does not include any non-zero transform coefficient.

In summary, in the technical solutions provided in the embodiments of this disclosure, for a CU using a BDPCM mode, first identification information indicates whether a TB corresponding to the CU includes a non-zero transform coefficient. If the first identification information indicates that the TB corresponding to the CU does not include any non-zero transform coefficient, an encoder side does not need to encode a transform tree syntax structure corresponding to the CU to encode and transmit a residual block, and correspondingly, a decoder side either does not need to decode a transform tree syntax structure corresponding to the decoding unit to decode and obtain a residual block, and may directly determine that the residual block corresponding to the decoding unit is an all-zero residual block, thereby improving the encoding and decoding efficiency of the CU using the BDPCM mode.

In addition, the encoding process of the encoder-side device corresponds to the decoding process of the decoder side device. For details that are not specifically described in the encoding process, reference may be made to the foregoing descriptions in the embodiments about the decoding process, and details are not described herein again.

The following is an apparatus embodiment of this disclosure, which may be used for performing the method embodiments of this disclosure. For details not disclosed in the apparatus embodiment of this disclosure, reference may be made to the method embodiments of this disclosure.

Figure 12:
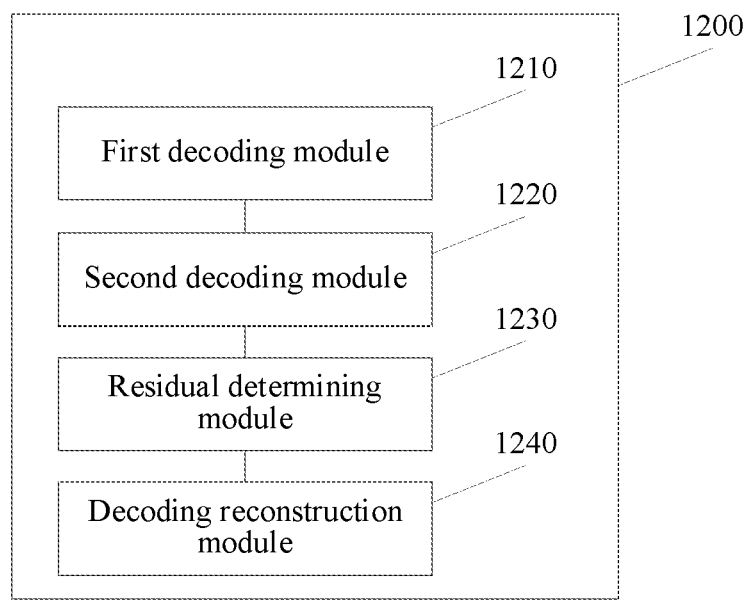
FIG. 12 is a block diagram of a video decoding apparatus according to an embodiment of this disclosure.

FIG. 12 is a block diagram of a video decoding apparatus according to an embodiment of this disclosure. The apparatus has functions of implementing the foregoing video decoding method embodiments. The functions may be implemented by hardware (e.g., processing circuitry), or may be implemented by hardware executing corresponding software. The apparatus may be the decoder-side device described above, or may be disposed on the decoder-side device. The apparatus 1200 may include a first decoding module 1210, a second decoding module 1220, a residual determining module 1230, and a decoding reconstruction module 1240. One or more modules of the apparatus can be implemented by processing circuitry, software, or a combination thereof, for example.

The first decoding module 1210 is configured to decode intra-frame prediction mode information corresponding to a current decoding unit.

The second decoding module 1220 is configured to decode first identification information corresponding to the current decoding unit when the intra-frame prediction mode information indicates that a BDPCM mode is applied to the current decoding unit, and all color components of the current decoding unit use the BDPCM mode, the first identification information indicating whether a TB corresponding to the current decoding unit includes a non-zero transform coefficient.

The residual determining module 1230 is configured to determine, when the first identification information indicates that the TB corresponding to the current decoding unit does not include any non-zero transform coefficient, that a residual block corresponding to the current decoding unit is an all-zero residual block.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The decoding reconstruction module 1240 is configured to reconstruct the current decoding unit according to the residual block and a prediction block corresponding to the current decoding unit.

In an exemplary embodiment, the first identification information is present in a CU syntax structure.

In one embodiment, the first identification information is cu_cbf, a value of cu_cbf being equal to 1 indicating that the TB corresponding to the current decoding unit includes a non-zero transform coefficient; and the value of cu_cbf being equal to 0 indicating that the TB corresponding to the current decoding unit does not include any non-zero transform coefficient.

In one embodiment, when a coding tree type corresponding to the current decoding unit is DUAL_TREE_LUMA, the value of cu_cbf being equal to 1 indicates that a luma TB corresponding to the current decoding unit includes a non-zero transform coefficient.

When the coding tree type corresponding to the current decoding unit is DUAL_TREE_CHROMA, the value of cu_cbf being equal to 1 indicates that at least one of a first chroma TB and a second chroma TB that correspond to the current decoding unit includes a non-zero transform coefficient.

When the coding tree type corresponding to the current decoding unit is SINGLE_TREE, the value of cu_cbf being equal to 1 indicates that at least one of the luma TB, the first chroma TB, and the second chroma TB that correspond to the current decoding unit includes a non-zero transform coefficient.

In an exemplary embodiment, the first identification information is present in a TU syntax structure.

In one embodiment, the first identification information is tu_cbf_chroma[xC][yC], a value of tu_cbf_chroma[xC][yC] being equal to 1 indicating that at least one of a first chroma TB and a second chroma TB that correspond to the current decoding unit includes a non-zero transform coefficient; and the value of tu_cbf_chroma[xC][yC] being equal to 0 indicating that neither of the first chroma TB and the second chroma TB that correspond to the current decoding unit includes a non-zero transform coefficient.

In one embodiment, the apparatus 1200 further includes: an entropy decoding module, configured to decode tu_cbf_chroma[xC][yC] by using an entropy decoding scheme of CABAC.

In an exemplary embodiment, the second decoding module 1220 is further configured to perform, when the current decoding unit meets a predefined condition, the step of decoding first identification information corresponding to the current decoding unit, the predefined condition including determining, according to a coding tree type corresponding to the current decoding unit, that all the color components of the current decoding unit use the BDPCM mode.

In one embodiment, the first identification information is present in a syntax structure of a CU, and the predefined condition includes the following.

The BDPCM mode is applied to a luma component of the current decoding unit, and at least one of the following conditions is met.

The coding tree type corresponding to the current decoding unit is DUAL_TREE_LUMA.

The coding tree type corresponding to the current decoding unit is SINGLE_TREE and a value of ChromaArrayType is not equal to 3, the value of the ChromaArrayType being equal to 3 indicating that 3 color components of the current decoding unit are not separately decoded and a chroma format is 4:4:4.

In one embodiment, the first identification information is present in a syntax structure of a CU, and the predefined condition includes the following.

The BDPCM mode is applied to chroma components of the current decoding unit, and the coding tree type corresponding to the current decoding unit is DUAL_TREE_CHROMA.

In one embodiment, the second decoding module 1220 is further configured to:

(1) decode second identification information corresponding to the current decoding unit when the first identification information indicates that the TB corresponding to the current decoding unit includes a non-zero transform coefficient, the second identification information being used for indicating whether a first chroma TB corresponding to the current decoding unit includes a non-zero transform coefficient; and (2) decode third identification information corresponding to the current decoding unit when at least one condition in a first condition set is met, the third identification information being used for indicating whether a second chroma TB corresponding to the current decoding unit includes a non-zero transform coefficient.

In one embodiment, the first condition set includes the following conditions.

Condition 1: The BDPCM mode is not applied to the chroma components of the current decoding unit.

Condition 2: The coding tree type corresponding to the current decoding unit is not DUAL_TREE_CHROMA.

Condition 3: A value of the second identification information indicates that the first chroma TB corresponding to the current decoding unit does not include any non-zero transform coefficient.

The first identification information can be present in a CU syntax structure or a TU syntax structure, and the predefined condition includes the following.

The BDPCM mode is applied to all the color components of the current decoding unit, and the coding tree type corresponding to the current decoding unit is SINGLE_TREE.

In one embodiment, the second decoding module 1220 is further configured to:

(1) decode second identification information corresponding to the current decoding unit when the first identification information indicates that at least one of a first chroma TB and a second chroma TB that correspond to the current decoding unit includes a non-zero transform coefficient, the second identification information being used for indicating whether the first chroma TB corresponding to the current decoding unit includes a non-zero transform coefficient; and (2) decode third identification information corresponding to the current decoding unit when at least one condition in a second condition set is met, the third identification information being used for indicating whether the second chroma TB corresponding to the current decoding unit includes a non-zero transform coefficient.

In one embodiment, the second condition set includes the following conditions.

Condition 1: The coding tree type corresponding to the current decoding unit is not SINGLE_TREE.

Condition 2: A value of the second identification information indicates that the first chroma TB corresponding to the current decoding unit includes a non-zero transform coefficient.

Condition 3: The BDPCM mode is not applied to all the color components of the current decoding unit.

In summary, in the technical solutions provided in the embodiments of this disclosure, a decoding unit using a BDPCM mode decodes first identification information corresponding to the decoding unit, to learn whether a TB corresponding to the decoding unit includes a non-zero transform coefficient. If the first identification information indicates that the TB corresponding to the decoding unit does not include any non-zero transform coefficient, a decoder side does not need to decode a transform tree syntax structure corresponding to the decoding unit to decode and obtain a residual block, and may directly determine that the residual block corresponding to the decoding unit is an all-zero residual block, thereby improving the encoding and decoding efficiency of the decoding unit using the BDPCM mode.

Figure 13:
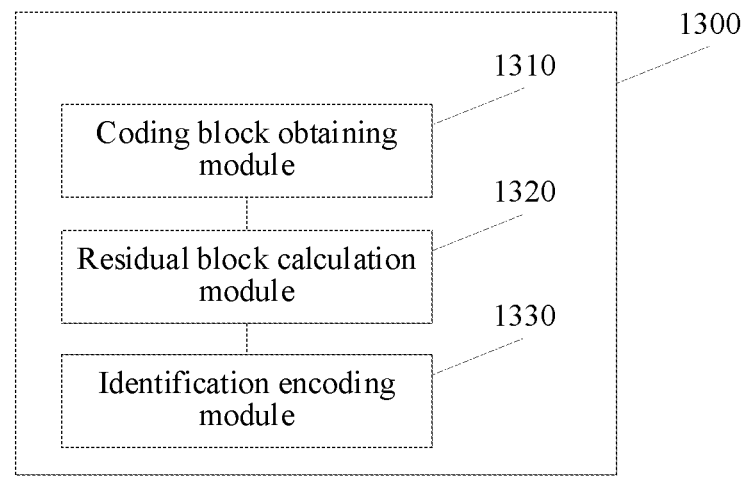
FIG. 13 is a block diagram of a video encoding apparatus according to an embodiment of this disclosure.

FIG. 13 is a block diagram of a video encoding apparatus according to an embodiment of this disclosure. The apparatus has functions of implementing the foregoing video encoding method embodiments. The functions may be implemented by hardware, or may be implemented by hardware executing corresponding software. The apparatus may be the encoder-side device described above, or may be disposed on the encoder-side device. The apparatus 1300 may include a coding block obtaining module 1310, a residual block calculation module 1320, and an identification encoding module 1330. One or more modules of the apparatus can be implemented by processing circuitry, software, or a combination thereof, for example.

The coding block obtaining module 1310 is configured to obtain a current CU.

The residual block calculation module 1320 is configured to calculate a residual block corresponding to the current CU according to the current CU and a prediction block corresponding to the current CU.

The identification encoding module 1330 is configured to encode first identification information corresponding to the current CU when the residual block corresponding to the current CU is an all-zero residual block, and all color components of the current CU use a BDPCM mode, the first identification information being used for indicating that a TB corresponding to the current CU does not include any non-zero transform coefficient.

In summary, in the technical solutions provided in the embodiments of this disclosure, for a CU using a BDPCM mode, first identification information indicates whether a TB corresponding to the CU includes a non-zero transform coefficient. If the first identification information indicates that the TB corresponding to the CU does not include any non-zero transform coefficient, an encoder side does not need to encode a transform tree syntax structure corresponding to the CU to encode and transmit a residual block, and correspondingly, a decoder side either does not need to decode a transform tree syntax structure corresponding to the decoding unit to decode and obtain a residual block, and may directly determine that the residual block corresponding to the decoding unit is an all-zero residual block, thereby improving the encoding and decoding efficiency of the CU using the BDPCM mode.

In addition, for details that are not described in detail on the encoder side, refer to the foregoing description in the embodiments about the decoder side, and details are not described herein again.

When the apparatus provided in the foregoing embodiments implements functions of the apparatus, the division of the foregoing functional modules is merely an example for description. In actual application, the functions may be assigned to and completed by different functional modules according to requirements, that is, an internal structure of the device is divided into different functional modules, to complete all or some of the functions described above. In addition, the apparatus and method embodiments provided in the foregoing embodiments belong to the same conception. For the specific implementation process, reference may be made to the method embodiments, and details are not described herein again.

Figure 14:
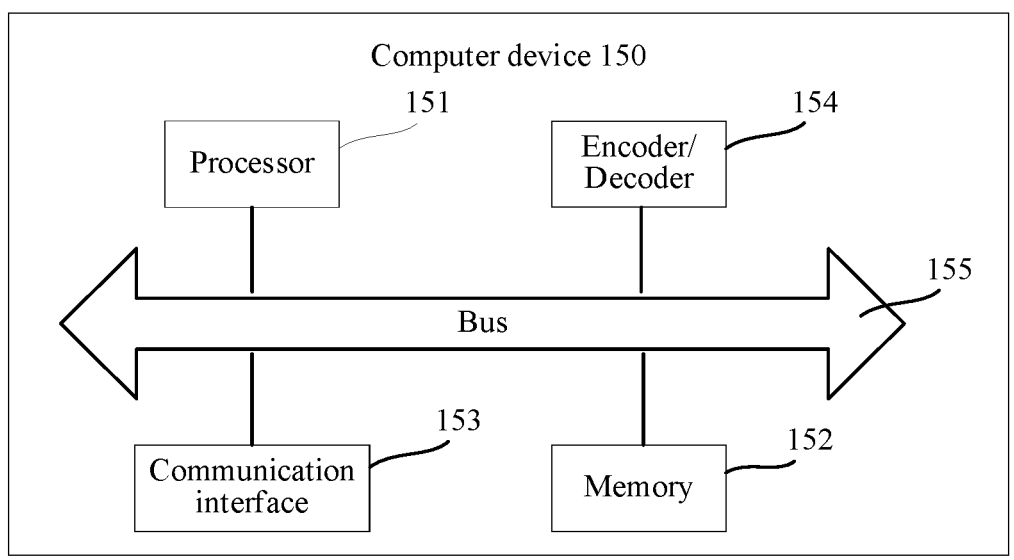
FIG. 14 is a structural block diagram of a computer device according to an embodiment of this disclosure.

FIG. 14 is a schematic block diagram of a computer device according to an embodiment of this disclosure. The computer device may be an encoder-side device described above, or may be a decoder-side device described above. The computer device 150 may include: a processor 151, a memory 152, a communication interface 153, an encoder/decoder 154, and a bus 155.

The processor 151 includes one or more processing cores (processing circuitry). The processor 151 runs a software program and a module to execute various functional applications and perform information processing.

The memory 152 may be configured to store a computer program, and the processor 151 is configured to execute the computer program, to implement the foregoing video encoding method or to implement the foregoing video decoding method.

The communication interface 153 may be configured to communicate with another device, for example, receive or transmit audio and video data.

The encoder/decoder 154 may be configured to implement encoding and decoding functions, for example, encoding and decoding audio and video data.

The memory 152 is connected to the processor 151 by the bus 155.

In addition, the memory 152 may be implemented by any type of a volatile or nonvolatile storage device or a combination thereof, and the volatile or nonvolatile storage device includes, but not limited to, a magnetic disk or an optical disc, an electrically erasable programmable read-only memory (EEPROM), an erasable programmable read-only memory (EPROM), a static random access memory (SRAM), a read-only memory (ROM), a magnetic memory, a flash memory, or a programmable read-only memory (PROM).

A person skilled in the art may understand that the structure shown in FIG. 14 does not constitute a limitation on the computer device 150, and the computer device may include more or fewer components than those shown in the figure, or some components may be combined, or a different component deployment may be used.

In an exemplary embodiment, a non-transitory computer-readable storage medium is further provided, storing at least one instruction, at least one program, a code set, or an instruction set, the at least one instruction, the at least one program, the code set, or the instruction set, when executed by processing circuitry, implementing the foregoing video decoding method, or implementing the foregoing video encoding method.

In an exemplary embodiment, a computer program product is further provided, the computer program product, when executed by processing circuitry, being configured to implement the foregoing video decoding method or implement the foregoing video encoding method.

It is to be understood that "plurality of" mentioned in this specification refers to two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

The foregoing descriptions are merely exemplary embodiments of this disclosure, but are not intended to limit this disclosure. Any modification, equivalent replacement, or improvement and the like made within the spirit and principle of this disclosure fall within the protection scope of this disclosure.

The invention claimed is:

1. A video decoding method, comprising:
   decoding intra-frame prediction mode information corresponding to a current decoding unit;
   decoding first identification information corresponding to the current decoding unit when the decoded intra-frame prediction mode information indicates that a block differential pulse code modulation (BDPCM) mode is applied to the current decoding unit, and all color components of the current decoding unit use the BDPCM mode, the first identification information being a single syntax element and indicating whether a transform block (TB) corresponding to the current decoding unit includes a non-zero transform coefficient;
   when a coding tree type corresponding to the current decoding unit is single tree and the single syntax element indicates that at least one of a luma TB, a first chroma TB, and a second chroma TB of the TB corresponding to the current decoding unit includes the non-zero transform coefficient, determining a residual block corresponding to the current decoding unit as a non-zero residual block;
   when the coding tree type corresponding to the current decoding unit is dual tree luma and the single syntax element indicates that the luma TB corresponding to the current decoding unit includes the non-zero transform coefficient, determining the residual block corresponding to the current decoding unit as the non-zero residual block;
   when the coding tree type corresponding to the current decoding unit is dual tree chroma and the single syntax element indicates that at least one of a first chroma TB and a second chroma TB that correspond to the current decoding unit includes the non-zero transform coefficient, determining the residual block corresponding to the current decoding unit as the non-zero residual block; and
   reconstructing the current decoding unit according to the residual block and a prediction block corresponding to the current decoding unit.

2. The method according to claim 1, wherein the first identification information is present in a coding unit (CU) syntax structure.

3. The method according to claim 2, wherein the first identification information is cu_cbf,
   a value of cu_cbf being equal to one indicating that the TB corresponding to the current decoding unit comprises the non-zero transform coefficient; and
   the value of cu_cbf being equal to zero indicating that the TB corresponding to the current decoding unit does not comprise any non-zero transform coefficients.

4. The method according to claim 1, wherein the first identification information is present in a transform unit (TU) syntax structure.

5. The method according to claim 4, wherein the first identification information is tu_cbf_chroma[xC][yC],
   a value of tu_cbf_chroma[xC][yC] being equal to one indicating that the at least one of the first chroma TB and the second chroma TB that correspond to the current decoding unit comprises the non-zero transform coefficient; and
   the value of tu_cbf_chroma[xC][yC] being equal to zero indicating that neither of the first chroma TB and the second chroma TB that correspond to the current decoding unit comprises the non-zero transform coefficient.

6. The method according to claim 5, further comprising:
   decoding tu_cbf_chroma[xC][yC] by using an entropy decoding scheme of context-based adaptive binary arithmetic coding (CABAC).

7. The method according to claim 1, further comprising:
   when the current decoding unit meets a predefined condition, decoding the first identification information corresponding to the current decoding unit,
   wherein the predefined condition comprises determining, according to the coding tree type corresponding to the current decoding unit, that all the color components of the current decoding unit use the BDPCM mode.

8. The method according to claim 7, wherein the first identification information is present in a syntax structure of a CU, and
   the predefined condition comprises (i) the BDPCM mode is applied to a luma component of the current decoding unit, and (ii) at least one of
   the coding tree type corresponding to the current decoding unit is the dual tree luma; or
   the coding tree type corresponding to the current decoding unit is the single tree and a value of ChromaArray Type is not equal to three, the value of the ChromaArray Type being equal to three indicating that three color components of the current decoding unit are not separately decoded and a chroma format is 4:4:4.

9. The method according to claim 7, wherein the first identification information is present in a syntax structure of a CU, and
   the predefined condition comprises the BDPCM mode is applied to chroma components of the current decoding unit, and the coding tree type corresponding to the current decoding unit is the dual tree chroma.

10. The method according to claim 9, wherein after the decoding the first identification information corresponding to the current decoding unit, the method further comprises:
    decoding second identification information corresponding to the current decoding unit when the first identification information indicates that the TB corresponding to the current decoding unit comprises the non-zero transform coefficient, the second identification information being used for indicating whether the first chroma TB corresponding to the current decoding unit comprises the non-zero transform coefficient; and
    decoding third identification information corresponding to the current decoding unit when at least one condition in a first condition set is met, the third identification information being used for indicating whether the second chroma TB corresponding to the current decoding unit comprises the non-zero transform coefficient.

11. The method according to claim 10, wherein the first condition set comprises:
    the BDPCM mode is not applied to the chroma components of the current decoding unit;
    the coding tree type corresponding to the current decoding unit is not the dual tree chroma; and
    a value of the second identification information indicates that the first chroma TB corresponding to the current decoding unit does not comprise any non-zero transform coefficients.

12. The method according to claim 7, wherein the first identification information is present in a CU syntax structure or a TU syntax structure, and the predefined condition comprises the BDPCM mode is applied to all the color components of the current decoding unit, and the coding tree type corresponding to the current decoding unit is the single tree.

13. The method according to claim 12, wherein after the decoding the first identification information corresponding to the current decoding unit, the method further comprises:

decoding second identification information corresponding to the current decoding unit when the first identification information indicates that at least one of the first chroma TB and the second chroma TB that correspond to the current decoding unit comprises the non-zero transform coefficient, the second identification information being used for indicating whether the first chroma TB corresponding to the current decoding unit comprises the non-zero transform coefficient; and decoding third identification information corresponding to the current decoding unit when at least one condition in a second condition set is met, the third identification information being used for indicating whether the second chroma TB corresponding to the current decoding unit comprises the non-zero transform coefficient.

14. The method according to claim 13, wherein the second condition set comprises:

the coding tree type corresponding to the current decoding unit is not the single tree;

a value of the second identification information indicates that the first chroma TB corresponding to the current decoding unit comprises the non-zero transform coefficient; and the BDPCM mode is not applied to all the color components of the current decoding unit.

15. A video encoding method, comprising:

obtaining a current coding unit (CU);

calculating a residual block corresponding to the current CU according to the current CU and a prediction block corresponding to the current CU; and encoding first identification information corresponding to the current CU when all color components of the current CU use a block differential pulse code modulation (BDPCM) mode, wherein the first identification information indicates that, when a coding tree type corresponding to the current CU is single tree, at least one of a luma transform block (TB), a first chroma TB, and a second chroma TB corresponding to the current CU includes a non-zero transform coefficient, the first identification information indicates that, when the coding tree type corresponding to the current CU is dual tree luma, the luma TB corresponding to the current CU includes the non-zero transform coefficient, and the first identification information indicates that, when the coding tree type corresponding to the current CU is dual tree chroma, at least one of the first chroma TB and the second chroma TB corresponding to the current CU includes the non-zero transform coefficient.

16. A video decoding apparatus, comprising:

processing circuitry configured to decode intra-frame prediction mode information corresponding to a current decoding unit;

decode first identification information corresponding to the current decoding unit when the decoded intra-frame prediction mode information indicates that a block differential pulse code modulation (BDPCM) mode is applied to the current decoding unit, and all color components of the current decoding unit use the BDPCM mode, the first identification information being a single syntax element and indicating whether a transform block (TB) corresponding to the current decoding unit comprises a non-zero transform coefficient;

when a coding tree type corresponding to the current decoding unit is single tree and the single syntax element indicates that at least one of a luma TB, a first chroma TB, and a second chroma TB of the TB corresponding to the current decoding unit includes the non-zero transform coefficient, determine a residual block corresponding to the current decoding unit as a non-zero residual block;

when the coding tree type corresponding to the current decoding unit is dual tree luma and the single syntax element indicates that the luma TB corresponding to the current decoding unit includes the non-zero transform coefficient, determine the residual block corresponding to the current decoding unit as the non-zero residual block;

when the coding tree type corresponding to the current decoding unit is dual tree chroma and the single syntax element indicates that at least one of a first chroma TB and a second chroma TB that correspond to the current decoding unit includes the non-zero transform coefficient, determine the residual block corresponding to the current decoding unit as the non-zero residual block; and reconstruct the current decoding unit according to the residual block and a prediction block corresponding to the current decoding unit.

17. A computer device, comprising processing circuitry and a memory, the memory storing at least one instruction, at least one program, a code set, or an instruction set, the at least one instruction, the at least one program, the code set, or the instruction set being loaded and executed by the processing circuitry to implement the method according to claim 1.

18. A non-transitory computer-readable storage medium, storing at least one instruction, at least one program, a code set, or an instruction set, the at least one instruction, the at least one program, the code set, or the instruction set being loaded and executed by processing circuitry to implement the method according to claim 1.

19. The method according to claim 1, wherein the first identification information is a flag, a value of the flag being equal to one indicating that the TB corresponding to the current decoding unit comprises the non-zero transform coefficient; and the value of the flag being equal to zero indicating that the TB corresponding to the current decoding unit does not comprise any non-zero transform coefficients.

* * * * *

UNITED STATES PATENT AND TRADEMARK OFFICE
CERTIFICATE OF CORRECTION

Page 1 of 1

PATENT NO. : 12,137,234 B2
APPLICATION NO. : 17/452289
DATED : November 5, 2024
INVENTOR(S) : Hongbin Zhang et al.

It is certified that error appears in the above-identified patent and that said Letters Patent is hereby corrected as shown below:

On the Title Page

Item (71), the Applicant city reads as:
Guangdong (CN)
The Applicant city should read as:
--Shenzhen (CN)--

Item (72), the Inventors' city reads as:
Guangdong (CN)
The Inventors' city should read as:
--Shenzhen (CN)--

Signed and Sealed this
Tenth Day of December, 2024

Katherine Kelly Vidal
*Director of the United States Patent and Trademark Office*